United States Patent
Hamilton et al.

(10) Patent No.: US 10,309,786 B2
(45) Date of Patent: Jun. 4, 2019

(54) NAVIGATIONAL AND LOCATION DETERMINATION SYSTEM

(71) Applicant: The United States of America as represented by the Secretary of the Navy, Washington, DC (US)

(72) Inventors: John Hamilton, Solsberry, IN (US); Steven Gunderson, Crane, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/438,246

(22) Filed: Feb. 21, 2017

(65) Prior Publication Data

US 2017/0219351 A1 Aug. 3, 2017

Related U.S. Application Data

(63) Continuation-in-part of application No. 14/053,974, filed on Oct. 15, 2013, now abandoned.

(60) Provisional application No. 61/713,695, filed on Oct. 15, 2012.

(51) Int. Cl.
| | |
|---|---|
| *G01C 21/16* | (2006.01) |
| *G01S 19/53* | (2010.01) |
| *G01S 19/47* | (2010.01) |
| *G01S 19/19* | (2010.01) |
| *G01S 19/14* | (2010.01) |

(52) U.S. Cl.
CPC ............ *G01C 21/165* (2013.01); *G01S 19/14* (2013.01); *G01S 19/19* (2013.01); *G01S 19/47* (2013.01); *G01S 19/53* (2013.01)

(58) Field of Classification Search
CPC ......... G01C 21/165; G01C 3/08; G01S 19/19; G01S 19/47; G01S 19/53
USPC ........................................................ 701/469
See application file for complete search history.

(56) References Cited

U.S. PATENT DOCUMENTS

| | | | |
|---|---|---|---|
| 6,208,937 B1* | 3/2001 | Huddle ............... | G01C 21/165 342/357.22 |
| 2012/0253656 A1* | 10/2012 | Brandt ................... | G01C 21/20 701/410 |
| 2014/0249750 A1* | 9/2014 | Hamilton ............. | G01C 21/165 701/469 |

OTHER PUBLICATIONS

Kevin J. Walchko, "Low Costs Inertial Navigation: Learning to Integrate Noise and Find Your Way", Aug. 2002, Thesis, 80 pages.
(Continued)

*Primary Examiner* — Gertrude Arthur Jeanglaude
(74) *Attorney, Agent, or Firm* — Christopher A. Monsey

(57) ABSTRACT

A navigation and location system is provided that can include an inertial measurement unit (IMU) comprising an in a strap down configuration and a global positioning system (GPS), and a control section that determines orientation of a range sensor aligned with one axis of the IMU with respect to the Earth based on a sequence of system orientation and location measurements from said IMU/GPS along a displaced path from a starting point (SP) to an activation point (AP). Remote geo-location of the object can be determined based on determined range and bearing to the object determined by rotating axis of at least one reference frame from the strap down IMU axis with gravity and aligning another axis with a line of longitude through the displacement path to determine true north then determining a azimuth or bearing angle between true north and the range sensor output axis oriented on the object.

9 Claims, 21 Drawing Sheets

(56) References Cited

OTHER PUBLICATIONS

Vectornav Embedded Navigation Solutions Library, Accelerometer Tutorial, downloaded at http://www.vectornav.com/support/library/accelerometer on Feb. 20, 2017, 6 pages.
CHRobotics, Using Accelerometers to Estimate Position and Velocity, downloaded at http://www.chrobotics.com/library/accel-position-velocity on Feb. 20, 2017, 3 pages.
Mark Pedley, Tilt Sensing Using a Three-Axis Accelerometer, Rev 6, Freescale Semiconductor, Inc., Document No. AN3461, Mar. 2013, 22 pages.
Weisstein, Eric W, Euler Angles From MathWorld—A Wolfram Web Resource, downloaded at http://mathworld.wolfram.com/EulerAngles.html on Feb. 20, 2107, 4 pages.
How to determine position from gyroscope and accelerometer input?, Electrical Engineering Stack Exchange, downloaded at http://meta.electronics.stackexchange.com/ on Feb. 20, 2017, 3 pages.
National Instruments Support Manuals, Transform to Rotation Matrix VI, downloaded at https://zone.ni.com/reference/en-XX/help/372983C-01/lvrobovi/transform_to_matrix/ on Feb. 20, 2017, 1 page.
National Instruments, Example Programs, Using rotational matrices to find the location of a point in a new coordinate system using both matrices and arrays, downloaded at https://forums.ni.com/t5/Example-Programs/Using-rotational-matrices-to-find-the-location-of-a-point-in-a/ta-p/3504110 on Feb. 20, 2017, 3 pages.
Steven M. Lavalle, Planning Algorithms, Yaw, pitch, and roll rotations, Cambridge University Press, Apr. 20, 2012, 2 pages.
Weisstein, Eric W, Rotation Formula From MathWorld—A Wolfram Web Resource, downloaded at http://mathworld.wolfram.com/RotationFormula.html on Feb. 20, 2107, 2 pages.
Weisstein, Eric W, Rotation Matrix From MathWorld—A Wolfram Web Resource, downloaded at http://mathworld.wolfram.com/RotationMatrix.html on Feb. 20, 2107, 3 pages.
Android API Guides, Motion Sensors, downloaded at https://developer.android.com/guide/topics/sensors/sensors_motion.html on Feb. 20, 2017, 9 pages.
Wikipedia, Rotation Matrix, downloaded from https://en.wikipedia.org/w/index.php?title=Rotation_matrix&oldid=765166080 on Feb. 20, 2017, 23 pages.
Tom Igoe, Making Things Talk, downloaded from http://physics.rutgers.edu/~aatish/teach/srr/workshop3.pdf on Feb. 20, 2017, pp. 291-298.

\* cited by examiner

| | ROUTINE NAME | FIGURE | DESCRIPTION |
|---|---|---|---|
| 701 | INITIALIZE_SPD | FIG. 14 (723)<br>FIG. 16 (801) | INITIALIZE SENSING/POINTING DEVICE (SPD)<br>GPS & IMU |
| 703 | OPERATE_SPD | FIG. 14 (725)<br>FIG. 16 (811)<br>FIG. 1 | OPERATE GPS & IMU TO MEASURE LOCATION,<br>ACCELERATION AND ORIENTATION |
| 705 | TRUE_NORTH | FIG. 14 (727)<br>FIG. 17 (821)<br>FIG. 2 | DETERMINE TRUE NORTH FROM GPS<br>GEOCENTRIC REFERENCE FRAME |
| 707 | DISPLACEMENT | FIG. 14 (729)<br>FIG. 18 (841)<br>FIG. 5, 6 | MEASURE INERTIAL DISPLACEMENT PATH<br>INERTIAL REFERENCE FRAME |
| 709 | CONVERT_REFERENCE_FRAME | FIG. 14 (731)<br>FIG. 18 (851)<br>FIG. 7 | CONVERT FROM INERTIAL TO HORIZONTAL<br>REFERENCE FRAME |
| 711 | BEARING_ANGLE | FIG. 14 (733)<br>FIG. 19 (861)<br>FIG. 8 | CALCULATE BEARING CORRECTION ANGLE<br>VIRTUAL REFERENCE FRAME |
| 713 | LASER_RANGE_FINDER | FIG. 14 (735)<br>FIG. 19 (871)<br>FIG. 9 | OPERATE LFR-MEASURE REMOTE LOCATION<br>VIRTUAL REFERNCE FRAME |
| 715 | REMOTE_LOCATION | FIG. 14 (737)<br>FIG. 20 (891)<br>FIG. 11 | CALCULATE REMOTE LOCATION<br>GEOCENTRIC REFERENCE FRAME |
| 717 | DISPLAY_LOCATION | FIG. 15 (743)<br>FIG. 21 (901)<br>FIG. 12<br>FIGS. 7, 8, 9 | DISPLAY LOCATION INFORMATION<br>GEOCENTRIC REFERENCE FRAME |
| 719 | COMMUNICATE_LOCATION | FIG. 15 (745)<br>FIG. 22 (921)<br>FIG. 12 | COMMUNICATE LOCATION INFORMATION<br>GEOCENTRIC REFERENCE FRAME |

FIG. 13

NAVIGATIONAL AND LOCATION DETERMINATION SYSTEM

CROSS-REFERENCE TO RELATED APPLICATIONS

The present application is a continuation of and claims priority to U.S. patent application Ser. No. 14/053,974, filed Oct. 15, 2013, entitled "NAVIGATIONAL AND LOCATION DETERMINATION SYSTEM," which claims priority to U.S. Provisional Patent Application Ser. No. 61/713,695, filed Oct. 15, 2012, entitled "GPS/IMU BASED NON-MAGNETIC NORTH SEEKER," and is also related to U.S. patent application Ser. No. 15/419,392, filed Jan. 30, 2017, entitled "REMOTE LOCATION DETERMINATION SYSTEM," the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,250) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention addresses a need to quickly find an accurate heading of a hand carried device without the need for magnetic field measurement associated with, for example, true north determinations. Portable systems capable of being carried by humans in a typical application desired by persons moving across country based on non-magnetic north (or south) seeking systems are not available due to a variety of limiting factors including size, weight, and power. Accordingly, in simplified terms, an invention has been created to provide a needed capability to determine a desired orientation of a sensor at a desired point with respect to the Earth (e.g., true north) based on determination of orientation of a reference axis of a sensor with respect to locations of multiple points and relationships between the multiple points with a significant degree of accuracy using non-magnetic directional sensing, orientation sensing, determinations via global positioning system (GPS), and a sequence of measurements along a displaced path. Location can include elevation of the sensor at each point of measurement which can be used in an embodiment. A desired orientation of the sensor at a desired point can include the first point at which a suitably accurate orientation, e.g., true north, can be determined e.g., less than five mil degrees accuracy (e.g., an angular mil can be found by dividing 360 degrees by 6400). A sequence of measurements can include at least two measurements in accordance with an embodiment of the invention along a path of travel which is, for example, not purely vertical in elevation. An embodiment of the non-magnetic directional sensing, navigational and orientation system can include an inertial navigation system coupled with a GPS system along with a control system adapted for executing a series of computations and generating results in accordance with an embodiment of the invention. Accordingly, multiple measurements and determinations can be made until a predetermined orientation accuracy value has been achieved.

Generally, an embodiment can include a navigation and location system is provided that can include an inertial measurement unit (IMU) comprising an in a strap down configuration and a GPS, and a control section that determines orientation of a range sensor aligned with one axis of the IMU with respect to the Earth based on a sequence of system orientation and location measurements from said IMU/GPS along a displaced path from a starting point to an activation point. Remote geo-location of the object can be determined based on determined range and bearing to the object determined by rotating axis of at least one reference frame from the strap down IMU axis with gravity and aligning another axis with a line of longitude through the displacement path to determine true north then determining an azimuth or bearing angle between true north and the range sensor output axis oriented on the object.

For example, an embodiment can provide a solution to meet unmet needs that includes, for simplification purposes, two parts. A first general part includes deriving a series of accurate location, elevation, and heading determinations via GPS. A second part includes accurately capturing an orientation of a sensing device in accordance with an embodiment of the invention and thus a direction that the non-magnetic sensor is pointing or orientated. An embodiment of the invention also includes a system adapted to execute the above parts in a variety of sequences to determine required information that is in turn used to identify with significant precision a needed geodetic or Earth fixed orientation.

An additional embodiment also is adapted to remote sensing of a specific location of a location of interest or object based on a combination of current navigation location/orientation and remote sensing of range/orientation to the location/object of interest. For example, an embodiment of the invention can provide a remote sensing/determination of position of an object/location of interest based on the non-magnetic based location/navigation/orientation determination capability. An example of remote sensing embodiments can include addition of a laser range finder (LRF) in addition to an additional set of computations in a control system in accordance with an embodiment of the invention. An exemplary embodiment can determine remotely coordinates of a location of interest (LoI) using such an embodiment.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 13 is an exemplary software function call list of a navigational and location determination system;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
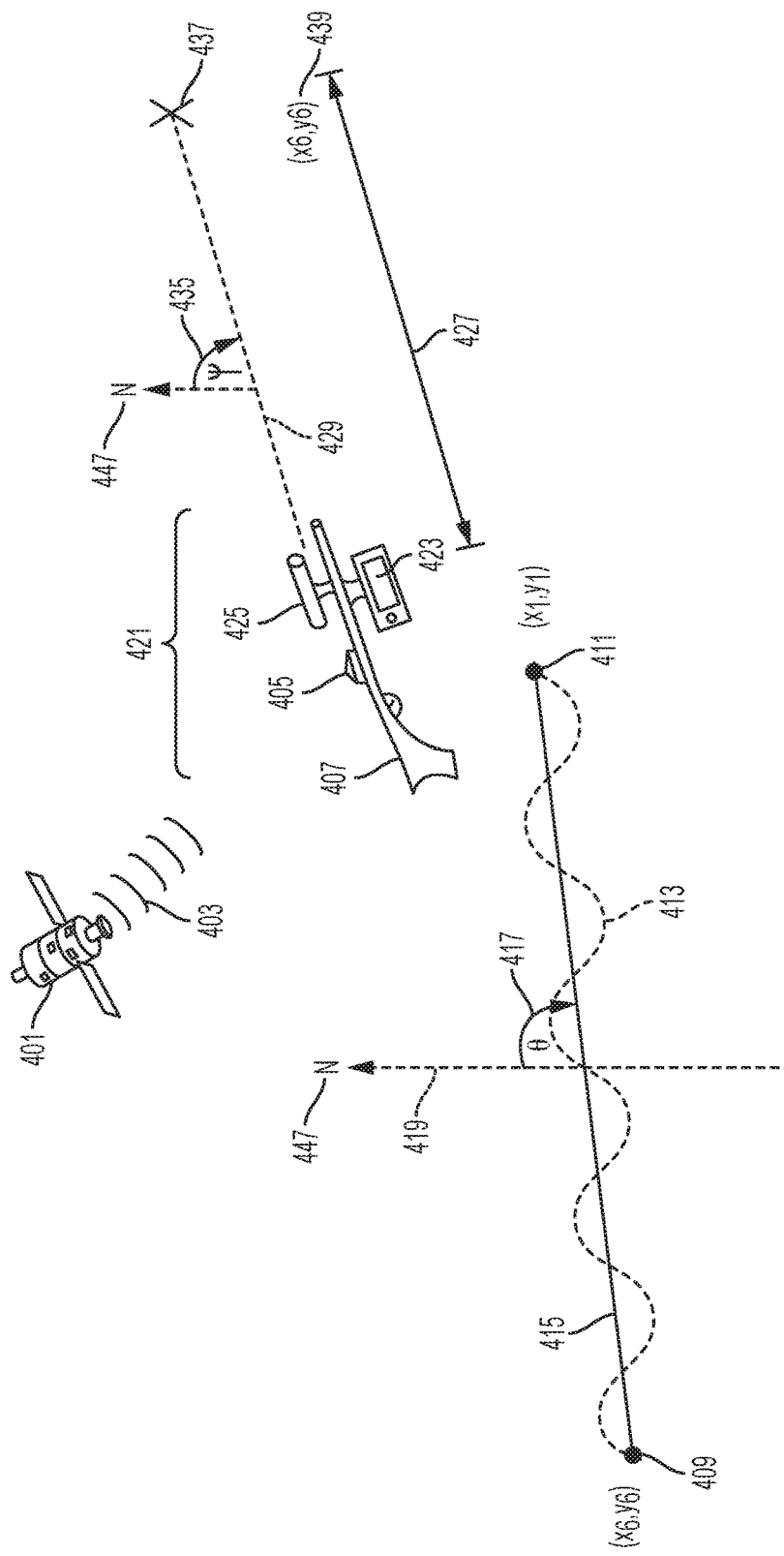
FIG. 1 shows an exemplary navigation and location system with a traveled path, and a sensing/pointing device with IMU, GPS and LRF used to identify remote location coordinates.

Referring initially to FIG. 1, a simplified exemplary architecture to determine remote location coordinates in absolute reference frame is shown that provides both context and environment for the exemplary system to operate. Global Navigation Satellite System (GNSS) 401, e.g. GPS, provides geospatial reference signals (GRS) 403 to GPS receiver 405 affixed to aiming structure 407. GPS receiver 405 measures geographical location waypoints 409, 411 in absolute geocentric reference frame. Initial waypoint 409 and final waypoint 411 are used to compute second displacement path 415 (direct) between endpoints 409, 411 resulting from first displacement path 413 (traveled). Second displacement path 415 is used to compute displacement heading 417 relative to longitude line 419 between initial waypoint 409 and final waypoint 411. Displacement heading 417 provides a reference for sensing/pointing device (SPD) 421 comprising of GPS receiver 405, aiming structure 407, inertial measurement unit (IMU) 423 and LRF 425. IMU 423 is aligned with aiming structure 407 and LRF 425 is likewise aligned with aiming structure 407 along imaginary reference line 429. IMU 423 measures SPD 421 bearing 435. LRF 425 measures range 427 to LoI 437, combined with SPD 421 bearing 435 and referenced to final waypoint 411, resulting in LoI's 437 remote location 439.

Figure 2:
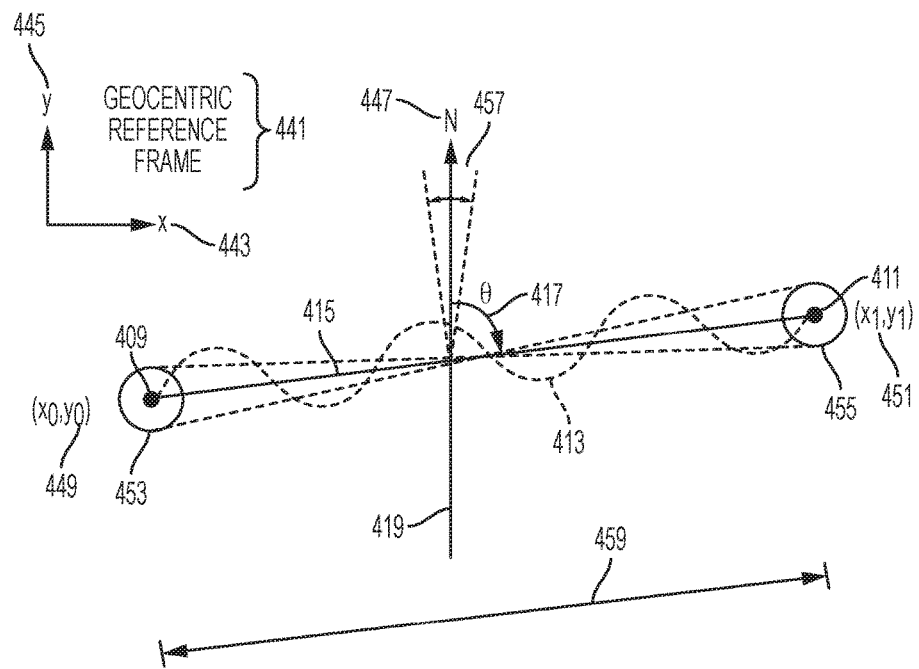
FIG. 2 shows an exemplary traveled path displacement heading measurement in absolute geocentric reference frame.

Referring to FIG. 2, an exemplary displacement heading 417 measurement within absolute geocentric reference frame 441, 443, 445, 447 is shown. An initial waypoint 409 starting location (x0,y0) 449 and final waypoint 411 end location (x1,y1) 451 are measured by SPD 421 GPS receiver 405 within GPS location uncertainties described by GPS error circles 453, 455. GPS error circle 453, 455 sizes are determined by number and location of GNSS satellites 401 visible to GPS receiver 405 from satellite ephemeris. Displacement heading 417 is calculated from starting location coordinates (x0,y0) 449 and end location coordinates (x1,y1) 451, and displacement heading 417 error 457 is calculated from displacement distance 459 and GPS error circles 453, 455. Displacement heading 417 error 457 is inversely proportional to displacement distance 459 and directly proportional to GPS error circles 453, 455 described by inverse tangent of error circle diameters 453, 455 and displacement distance 459.

Figure 3:
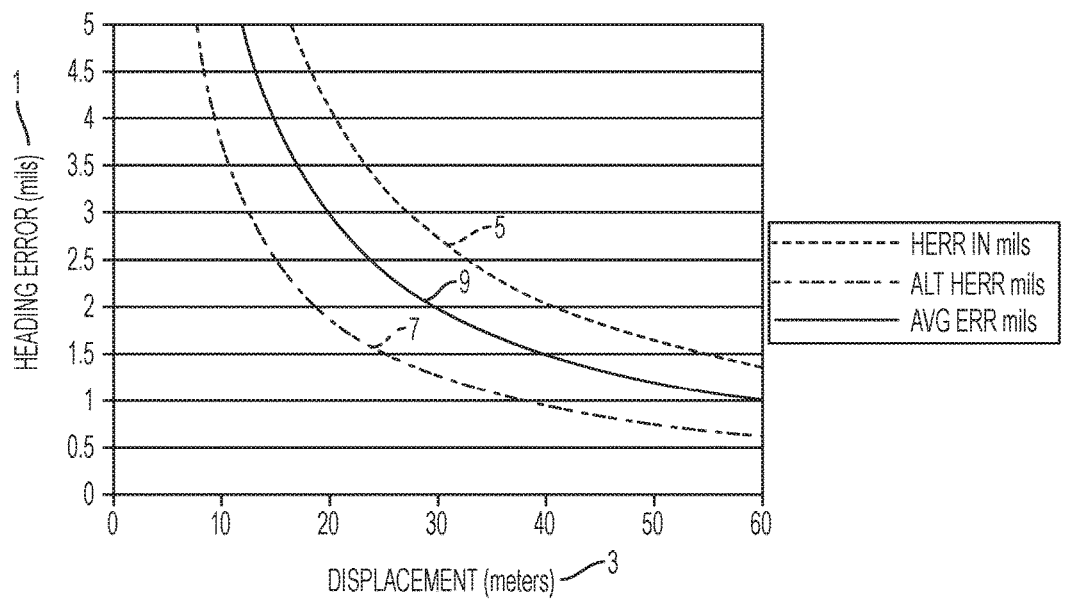
FIG. 3 shows an exemplary graph showing resulting heading error as a function of displacement.

FIG. 3 shows a graph detailing resulting heading error 1 as a function of displacement 3. Land-based Differential Global Positioning System (DGPS) and satellite-based Wide Area Augmentation System (WAAS) typically offer 1 meter GPS accuracy; Real Time Kinematic (RTK) GPS measures carrier phase and offers centimeter accuracy but requires nearby linked reference station making it impractical for mobile waypoint measurement with a single device; and carrier phase tracking GPS offers decimeter or better accuracy with a single device, but accuracy degrades with time between measurements. FIG. 3 assumes carrier phase tracking GPS with 0.06 meter (2.5 inch) accuracy over 60 second measurement period. Heading error ($H_{err}$) 5 was derived using latitude and longitude calculation in local level Cartesian (LLC) plane, and Alternate Heading error (Alt $H_{err}$) 7 was derived using simplified calculations employed by most GPS receivers. Avg error 9 is the average of the two methods. GPS receivers calculate their position in an Earth Centered, Earth Fixed (ECEF) frame and the error associated with this frame is comparable to the error associated with a latitude and longitude measurement, but somewhat less. Increased displacement distance 3 improves heading 1 uncertainty 5, 7, 9.

Displacement path shown in FIG. 1 and further described in FIG. 2 can be any direction and is independent of the path taken. Accuracy of heading measured via displacement is dependent upon displaced distance and GPS accuracy. The squiggly line in FIG. 1 and FIG. 2 shows independence of path 413 taken where only a total horizontal straight path 415 distance is displaced (e.g., horizontal displacement is used in calculations to determine orientation and heading).

Figure 4:
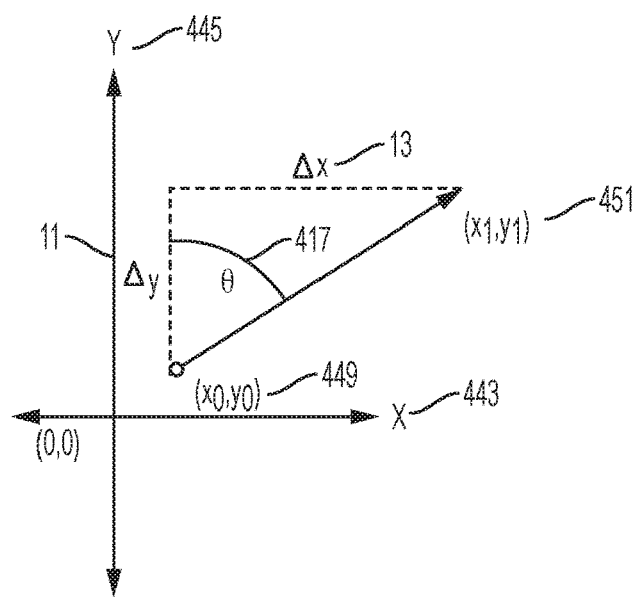
FIG. 4 shows a simplified direction traveled in a two dimensional grid reference which is useful in creating a result having a predetermined degree of non-magnetic direction sensing accuracy.

FIG. 4 shows a simplified direction traveled in a two dimensional grid reference. Referring to FIG. 4, the (x0,y0) 449 and (x1,y1) 451 positions are measured via a GPS receiver 405, after which positions in a local level Cartesian (LLC) plane are calculated. The LLC is based on the assumption that the earth is locally flat on the scale that is being measured. The curvature of the earth is 0.013 cm/km, so for displacements of 200 meters or less a LLC assumption or approximation is valid.

To convert Δlat to Δy & Δlon to Δx in LLC the formulas below can be used. A midpoint between two latitude or longitude points is labeled ML and equals the latitude/longitude midway between x0,y0 449 & x1,y1 451 as in equation 1 (note all latitude and longitude measurements are in degree decimal notations).

$$\begin{cases} MLat = \dfrac{lat_0 + lat_1}{2} \\ MLon = \dfrac{lon_0 + lon_1}{2} \end{cases} \quad (1)$$

Next the change in latitude and longitude are converted to a change in meters. This is done by finding the number of meters per degree of latitude and longitude (MDL). MDL are found with the following equations (note cos (x) is the degree cos and not radian cos):

$$\begin{cases} \dfrac{meters}{°lon} = 1114151.3 * \cos(MLon) - \\ \qquad 945.5 * \cos(3MLon) + 1.2 * \cos(5MLon) \\ \dfrac{meters}{°lat} = 1111320.9 - 5660.5 * \cos(2MLat) + 12.0 * \cos(4MLat) \end{cases} \quad (2)$$

Then the displacement in North/South (Δy) 11 and East/West (Δx) 13 are calculated using equation 3.

$$\begin{cases} \Delta x = \dfrac{meters}{°lon} * (lon_0 - lon_1) \\ \Delta y = \dfrac{meters}{°lat} * (lat_0 - lat_1) \end{cases} \quad (3)$$

From FIG. 4 the derivation of the heading angle θ 417 can be derived with the use of the inverse tangent function and calculated using equation 4 (note arctan 2 is the 4 quadrant arctangent function).

$$\theta = \arctan 2(\Delta x, \Delta y) \quad (4)$$

The error associated with the heading angle 417 is then found using equations 5 through 9.

$$ML_{err} = \sqrt{(lat_0^{err})^2 + (lat_1^{err})^2} = \sqrt{(lon_0^{err})^2 + (lon_1^{err})^2} \quad (5)$$

$ML_{err}$ is the error term for latitude0±latitude1, longitude0±longitude1, MLat, and MLon.

$$\begin{cases} \left.\dfrac{m}{°lon}\right|_{err} = ML_{err} * \sqrt{\sin(ML)^2 + 9\sin(3ML)^2 + 25\sin(5ML)^2} \\ \left.\dfrac{m}{°lat}\right|_{err} = 2ML_{err} * \sqrt{\sin(2ML)^2 + 4\sin(4ML)^2} \end{cases} \quad (6)$$

$$\begin{cases} \Delta x_{err} = \sqrt{\left(\dfrac{\left.\frac{m}{°lon}\right|_{err}}{\frac{m}{°lon}}\right)^2 + \left(\dfrac{ML_{err}}{lon_0 - lon_1}\right)^2} \\ \Delta y_{err} = \sqrt{\left(\dfrac{\left.\frac{m}{°lat}\right|_{err}}{\frac{m}{°lat}}\right)^2 + \left(\dfrac{ML_{err}}{lat_0 - lat_1}\right)^2} \end{cases} \quad (7)$$

Equation 7 could also be modeled with the knowledge that GPS receivers do all of their calculations in the ECEF frame and that on the scale of 500 meters or less the earth is locally flat. Thus ΔX, ΔY, and ΔZ each depend on the accuracy of the GPS receiver being used. This changes equation 7 to look like equation 8. (Note (ΔX,ΔY,ΔZ) refer to the change displacement as measured in ECEF; not the calculated change of (x,y,z) as measured in the LLC.

$$\begin{cases} \Delta x_{err} = \sqrt{\dfrac{gps\_accuracy_{ECEF}}{\Delta X}} \\ \Delta y_{err} = \sqrt{\dfrac{gps\_accuracy_{ECEF}}{\Delta Y}} \end{cases} \quad (8)$$

Equation 9 then gives the heading uncertainty associated with the straight line heading between two points.

$$\theta_{err} = \sqrt{\left(\dfrac{\Delta x_{err}}{\Delta x}\right)^2 + \left(\dfrac{\Delta y_{err}}{\Delta y}\right)^2} * \dfrac{1}{1+\theta^2} \quad (9)$$

The azimuth angle in equation 4, and the corresponding error in equation 9, are in radians and can be converted to degrees or mils with ease, as shown in equation 10.

$$\begin{cases} 1 \text{ mil} = \dfrac{360°}{6400} = 0.05625° \\ 1 \text{ mil} = \dfrac{2\pi}{6400} = 9.817e - 4 \text{ rad} \\ 1° = \dfrac{\pi}{180} \text{ rad} = 0.01745 \text{ rad} \end{cases} \quad (10)$$

In an exemplary embodiment, a second part of one aspect of a problem is discerning a bearing 435 of a GPS receiver 405 once the displacement heading 417 is determined. Determining bearing 435 in this context can be done taking into account that an IMU 423 in standalone mode can be a relative navigator, but when coupled with an external source, such as GPS 401, 405, can become an absolute navigator. For the non-magnetic compass this can be executed by assembling the IMU 423 and GPS receiver 405 into a strap down configuration with one axis aligned with an axis of the sensor/pointing device 421 (e.g., LRF) output such that this axis is aligned with an imaginary reference line 429 through the sensor/pointing device (e.g., LRF) 421. The reference line's 429 orientation and acceleration can be then tracked from start location 409 (x0,y0) to end location 411 (x1,y1) allowing the exemplary embodiment device to give a bearing 435 relative to the imaginary reference line 429.

Figure 5:
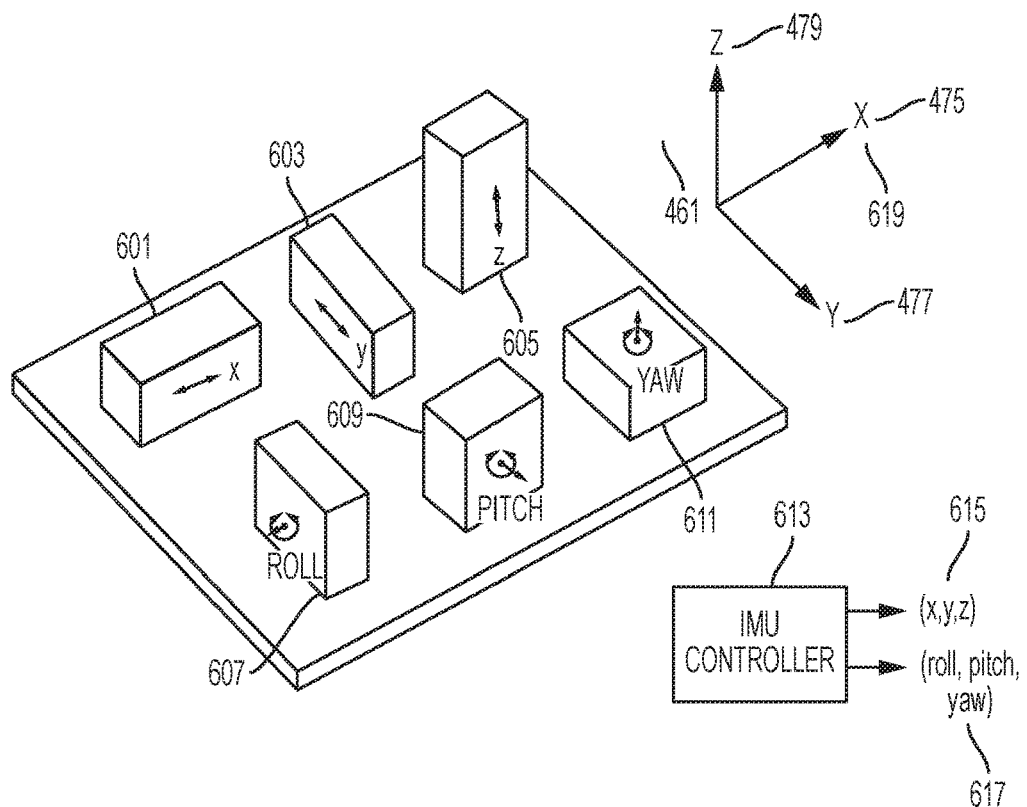
FIG. 5 shows exemplary IMU accelerometers and gyroscopes within an exemplary inertial reference frame.

Referring to FIG. 5, an exemplary inertial measurement unit (IMU) 423 and components are shown. IMU 423 combines three accelerometers 601, 603, 605 and three gyroscopes 607, 609, 611 aligned along orthogonal axis. Accelerometers 601, 603, 605 axis are identified as X, Y, Z with X axis 475 aligned with sensor/pointing device 421 imaginary reference line 429, i.e. pointing direction 619. Gyroscopes 607, 609, 611 are aligned with X, Y, Z axis respectively and identified as: roll, pitch, and yaw. IMU 423 contains an IMU controller 613 which combines accelerometer 601, 603, 605 and gyroscope 607, 609, 611 measurements to provide location 615 and orientation measurements 617 along third displacement path 431 (traveled) in inertial reference frame 461, 475, 477, 479.

Figure 6:
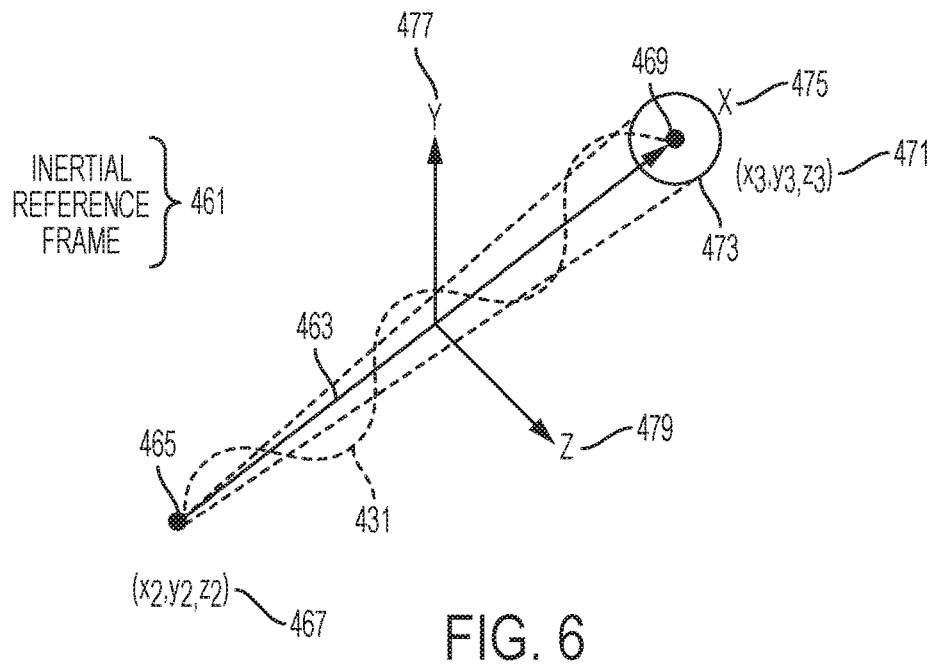
FIG. 6 shows exemplary traveled path displacement heading measurement in a sensing/pointing device inertial reference frame.

Referring to FIG. 6, exemplary IMU 423 inertial reference frame 461 traveled path displacement heading measurement is shown. IMU 423 measures a third displacement path 431 (traveled) while SPD 421 is transiting first displacement path 413 (traveled). Third displacement path 431 (traveled) is measured in IMU's 423 inertial reference frame 461, 475, 477, 479. A fourth displacement path 463 (direct) is computed from IMU's 423 third displacement path 431 (traveled) using start location 465 coordinates (x2, y2, z2) 467 and end location 469 coordinates (x3, y3, z3) 471 measured at same time as GPS locations 449, 451. End waypoint 469 measurement error 473 accumulates during travel 431, 463 and is proportional to time. Minimizing time between measurements reduces measurement error. For clarity, fourth displacement path 463 is shown aligned with IMU's 423 inertial reference frame 461 X axis 475, although not necessarily so in practice.

Exemplary imaginary reference line's 429 orientation with respect to SPD's 421 displacement heading angle (θ) 417 can be determined by comparing IMU's 423 start waypoint 465 location (x2, y2, z2) 467 and end waypoint 469 location (x3, y3, z3) 471 measurements along third displacement path 463 (traveled) in IMU's inertial reference frame 461 marking fourth displacement path 463, with start waypoint 409 and end waypoint 411 location measurements 449, 451 in absolute geocentric reference frame 441. GPS's absolute geographic reference frame 441 measurements are two-dimensional (X, Y) 443, 445 without altitude (z) component. IMU's inertial reference frame measurements are three-dimensional (X, Y, Z) 475, 477, 479 with arbitrary orientation relative to geocentric reference frame 441. Inertial reference frame 461 can be aligned to geocentric reference frame 441 using a multi-step process. Inertial reference frame 461 alignment to geocentric reference frame 441 can be done using, e.g., a rotational matrix, virtual IMU/INU or the like.

Figure 7:
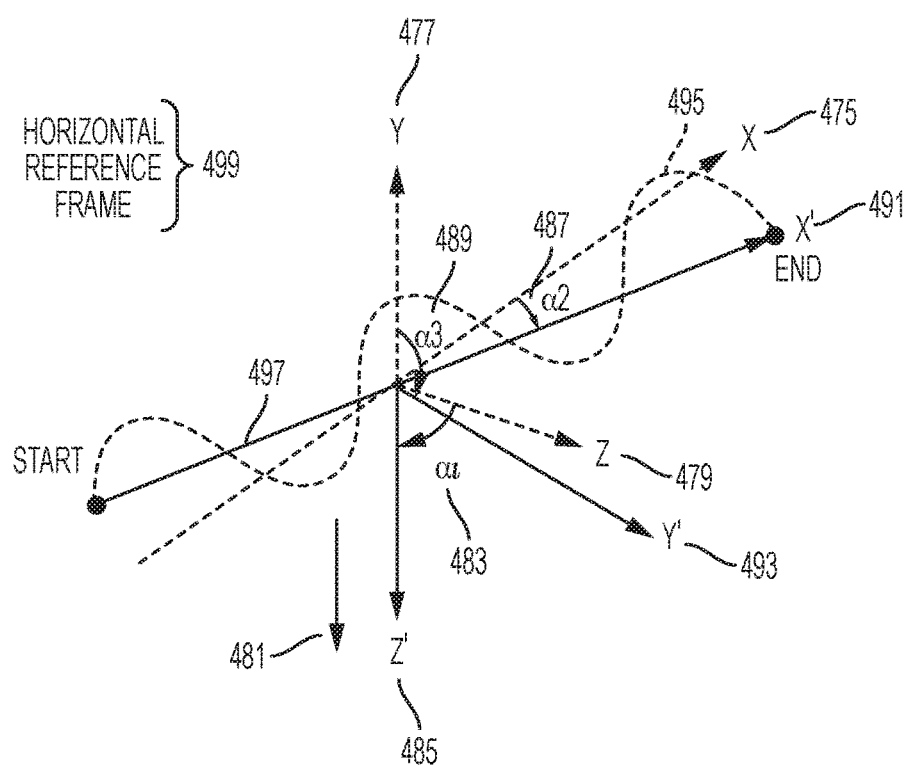
FIG. 7 shows exemplary sensing/pointing device inertial reference frame rotation with respect to gravity to horizontal reference frame.

Referring to FIG. 7, an exemplary IMU 423 inertial reference frame 461 rotation with respect to gravity 481 to horizontal reference frame 499 is shown. Gravity 481 is a constant 9.81 m/sec acceleration measured by IMU's accelerometers 601, 603, 605 and provides a true vertical reference when IMU 423 is not experiencing translational acceleration. This can be achieved when SPD 421 IMU 423 is still, and can be used for IMU calibration. IMU's Z axis 479 is rotated and aligned with gravity 481 by angle $\alpha_1$ 483 creating a new virtual Z' axis 485. This rotates inertial X axis 475 by angle $\alpha_2$ 487 and inertial Y 477 axis by angle $\alpha_3$ 489 to horizontal plane described by new X' axis 491 and new Y' axis 493. This rotates third displacement path 431 (traveled) to fifth displacement path 495 (traveled) and fourth displacement path 463 (direct) to sixth displacement path 497 (direct) onto horizontal plane defined by new X' axis 491 and new Y' axis 493. This creates a horizontal reference frame 499. Frame rotation can be done using, e.g., one or more rotational matrices that can be implemented a variety of ways including through software executed by a processor in a system that includes the SPD as well as, e.g., a virtual IMU/INU.

Figure 8:
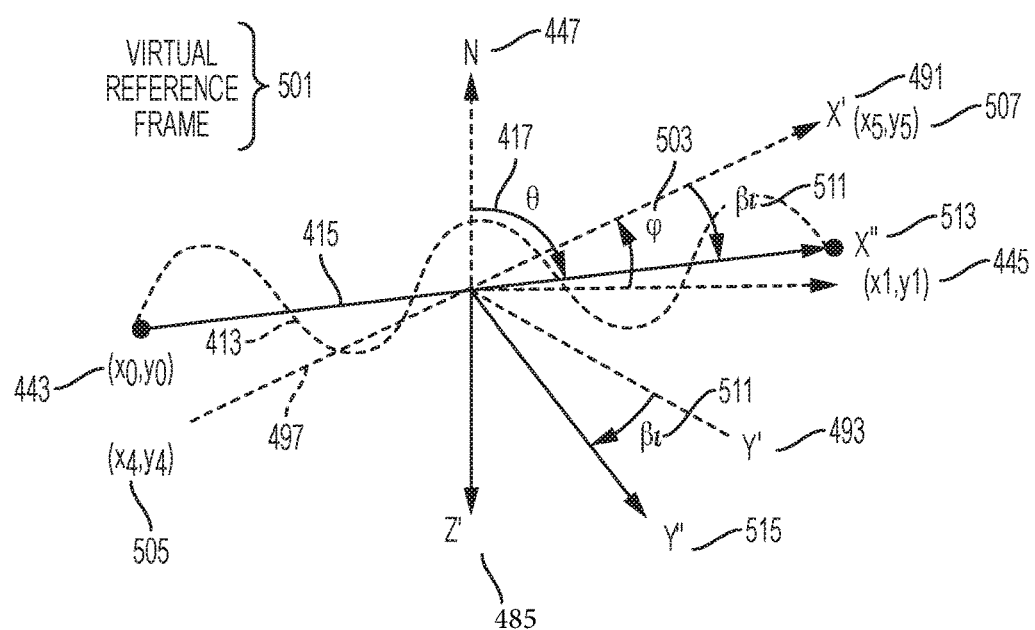
FIG. 8 shows exemplary sensing/pointing device inertial reference frame rotation to virtual reference frame.

Referring to FIG. 8, an exemplary IMU 423 horizontal reference frame 499 rotation to virtual reference frame 501 is shown. Horizontal reference 499 frame sixth displacement path 497 angle (φ) 503 is computed from sixth displacement path 497 start coordinates (x4,y4) 505 and end coordinates (x5,y5) 507. Horizontal reference 499 frame second displacement path 415 heading angle (θ) 417 is computed from second displacement path 415 start coordinates (x0,y0) 443 and end coordinates (x1,y1) 445. First displacement path heading angle (θ) 417 is normalized to true north 447 whereas sixth displacement path 497 angle (φ) 503 is normalized to geocentric reference frame 441 x axis 443 aligned with East-West longitude direction. Difference between second displacement path 415 heading angle (θ) 417 and sixth displacement path 497 angle (φ) 503 determines bearing correction angle (βi) 511 between geocentric reference frame 441 and virtual reference frame 501. Horizontal reference frame 499 X' axis 491 and Y' axis 493 are rotated by bearing correction angle (βi) 511 to virtual reference frame 501 new X" axis 513 and Y"' axis 515. Virtual reference frame 501 X" axis 513 and Y" axis 515 are thus aligned with geocentric reference frame 441 'x' axis 443 and 'y' axis 445 within error 457. Exemplary reference frame rotations can be implemented using a variety of approaches including, e.g., rotational matrixes.

Figure 9:
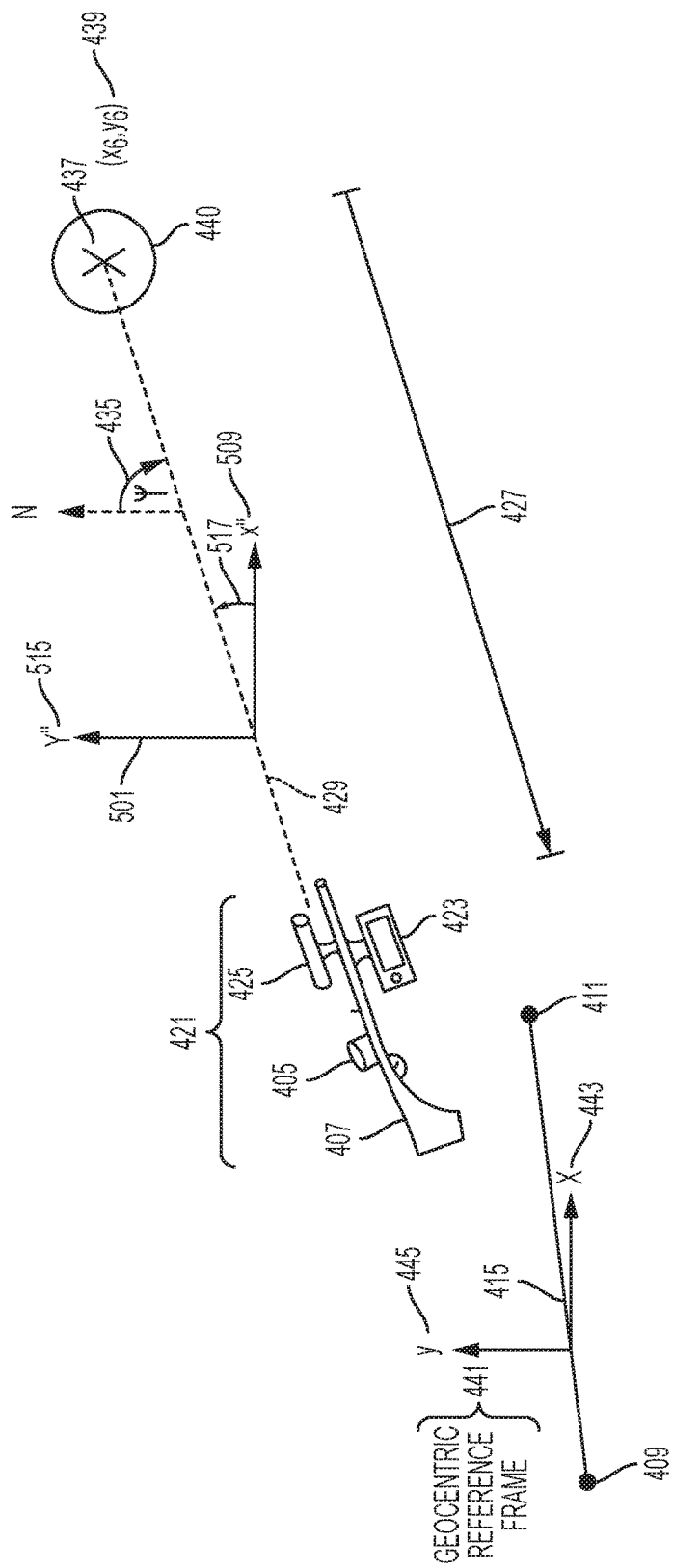
FIG. 9 shows exemplary sensing/pointing device pointing direction conversion to bearing.

Referring to FIG. 9, an exemplary SPD 421 orientation 517 conversion to bearing (ψ) 435 is shown. SPD 421 IMU 423 virtual reference frame 501 measures imaginary reference line 429 orientation 517. The exemplary IMU absolute reference frame calibration process measures and calculates bearing correction angle (βi) 511 needed to apply to SPD 421 orientation 517 to determine bearing (ψ) 435. LRF 425 measures range 427 to location of interest 437, combined with SPD 421 bearing angle (ψ) 435 and referenced to second displacement path 415 final waypoint 411, results in LoI's 437 remote location (x6,y6) 439. Remote location (x6,y6) 439 in LLC plane is converted to geocentric reference frame 441 coordinates in latitude and longitude.

Once the exemplary imaginary reference line's 429 orientation 517 with respect to SPD's 421 displacement heading 417 is established, future orientation 517 can be tracked with the IMU's 423 gyroscopes 607, 609, 611 between GPS receiver 405 updates. Thus the exemplary SPD 421 can automatically track GPS waypoints 409, 411, heading 417, and SPD 421 orientation 517 once turned on, with no user intervention. The SPD 421 IMU 423 can be calibrated using GPS 405 waypoints 409, 411 to determine bearing (ψ) 435 relative to true north 447 without using a magnetic compass. The SPD 421 can be used to implement a non-magnetic based compass equivalent. It, however, requires SPD 421 to be translated or physically traversed horizontally with sufficient distance 459 and with sufficient GPS accuracy 453, 455 to determine heading angle 417 within acceptable resolution. In one embodiment, assuming walking rate of 1 meter/sec with 60 second GPS updates provides displacement distance 459 of 60 meters. This exemplary distance combined with carrier phase tracking GPS accuracy of 0.06 meters yields 1 mil displacement heading 417 uncertainty (or error) 457.

Figure 10:
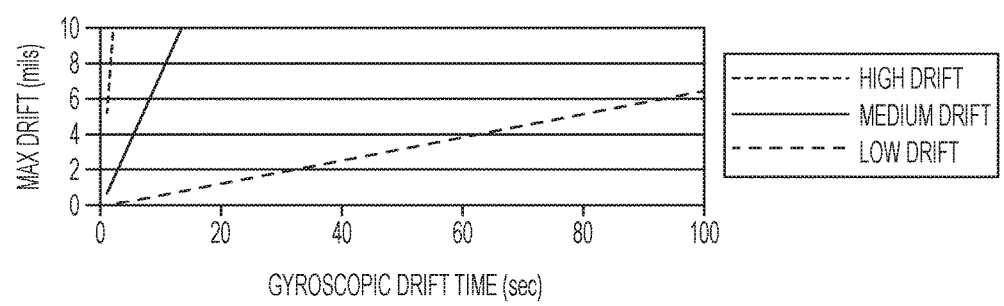
FIG. 10 shows exemplary simulated gyroscopic drift.

Dominate orientation error becomes or defines IMU's 423 gyroscopes 607, 609, 611 accuracy. In a calibrated IMU 423 the exemplary dominate terms in gyroscopic error are gyroscopic drift and angular random walk (ARW). FIG. 10 shows results of these drifts on heading accuracy for three grades of gyroscopes: low-grade automotive/consumer (1100 deg/hr), mid-grade industrial (150 deg/hr), and high-grade tactical (13 deg/hr). For reference, Earth rotates 15 deg/hr. Attitude Heading Reference System (AHRS) combining 3-axis gyroscope, 3-axis accelerometer and 3-axis magnetometer can reduce gyroscopic drift by compensating gyroscope drift using gravity and earth magnetic field reference vectors. This embodiment allows industrial grade microelectronic mechanical system MEMS IMU to achieve high-grade tactical performance. Thus, the exemplary total heading error is the summation of GPS displacement heading error and gyroscopic drift error.

For example, an exemplary system having one meter GPS accuracy could include an embodiment where a user travels at a heading of 90° for 60 meters for 60 seconds. An exemplary SPD 421 can measure 90°±1 mil according to GPS displacement. Then a user, within 3 seconds of stopping, points the SPD 421 and the imaginary reference line 429 at an object in the range 437. The exemplary SPD 421 measures the change in orientation 517 from the heading traveled 417 to the direction pointed 517 and returns a compass heading of 23.5°±4.2 mils 435. The ±4.2 mils is composed of 1 mil error from the displacement and 2.8 mils error from the gyro drifting during the first 60 seconds and 0.14 mils error during the 3 seconds used to acquire a heading sight.

Figure 11:
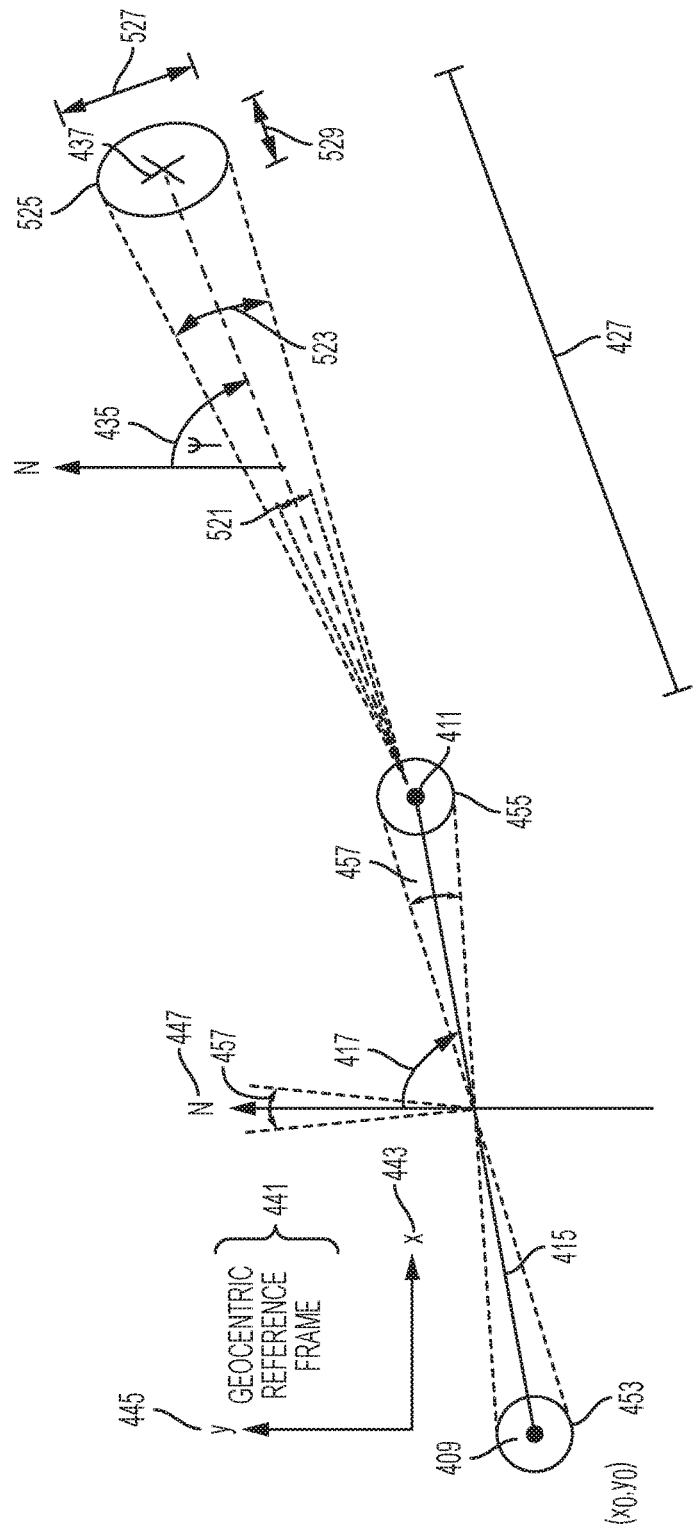
FIG. 11 shows exemplary sensing/pointing device pointing direction (bearing) error and uncertainty circle calculation.

Referring to FIG. 11, an exemplary SPD 421 location of interest 437 location uncertainty 525 calculation is shown. Displacement heading error 457 added to orientation error 521 equals bearing error 523. Bearing error 523 (in angular mils) multiplied by LRF range 427 equals horizontal location uncertainty 527 ($H_U$). LRF 425 accuracy determines axial down-range uncertainty ($D_U$) 529. Lateral (horizontal $H_U$) 527 and axial (down-range $D_U$) 529 uncertainty describe location uncertainty 525. Horizontal location uncertainty may differ from axial uncertainty, forming an oval.

Figure 12:
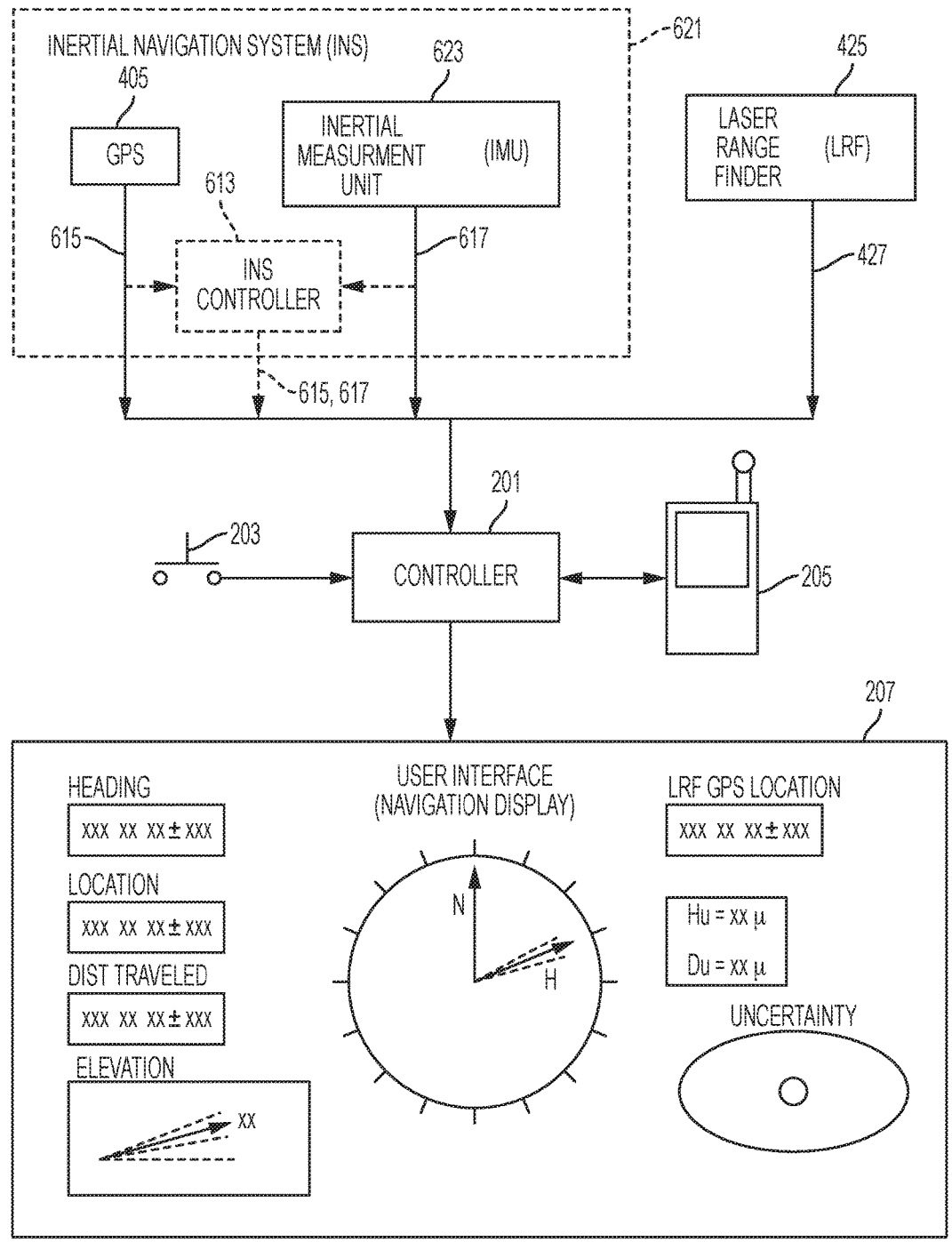
FIG. 12 shows an exemplary block diagram of system components.

FIG. 12 shows an exemplary system block diagram. An inertial navigation system (INS) 621 (INS 621 can also can be referred to as a virtual INS interchangeably in an embodiment herein) comprising a GPS 405 and IMU 623 including accelerometers (e.g., FIG. 5 elements 601, 603, 605) and gyroscopes (e.g., FIG. 5 elements 607, 609, 611); LRF 425; controller 201; user interface (navigation display) 207; switch 203; and communications device 205. INS 621, combing both GPS 405 and IMU 623 can include its own INS controller 613 to fuse GPS and IMU inputs into location (x, y, z) 615 and orientation (roll, pitch, yaw) measurements 617. LRF provides LRF range 427 to location of interest (FIG. 9, element 437). Switch 203 signals controller 201 to measure and record SPD 421 (FIGS. 5 and 9, element 421) location (FIGS. 1 and 9 element 411), bearing (ψ) (FIGS. 1 and 9 element 435), and LoI's (FIG. 9, element 437) remote location (FIG. 9, element 439). Locations 411, 439 and bearing (ψ) 435 can be digitally communicated by communications device 205. A user interface (navigation display) 207 on IMU/controller 423 can display locations 411, 439 and (ψ) bearing 435 so that a user can determine their location 411 and remote location 439 to read these coordinates by voice.

Referring to FIG. 13, an exemplary function list of a navigational and location determination system. Exemplary routine 701 Initialize_SPD, FIG. 14 step 723, initializes SPD 421 GPS 405 and IMU 423 and prepares them to operate.

Figure 14:
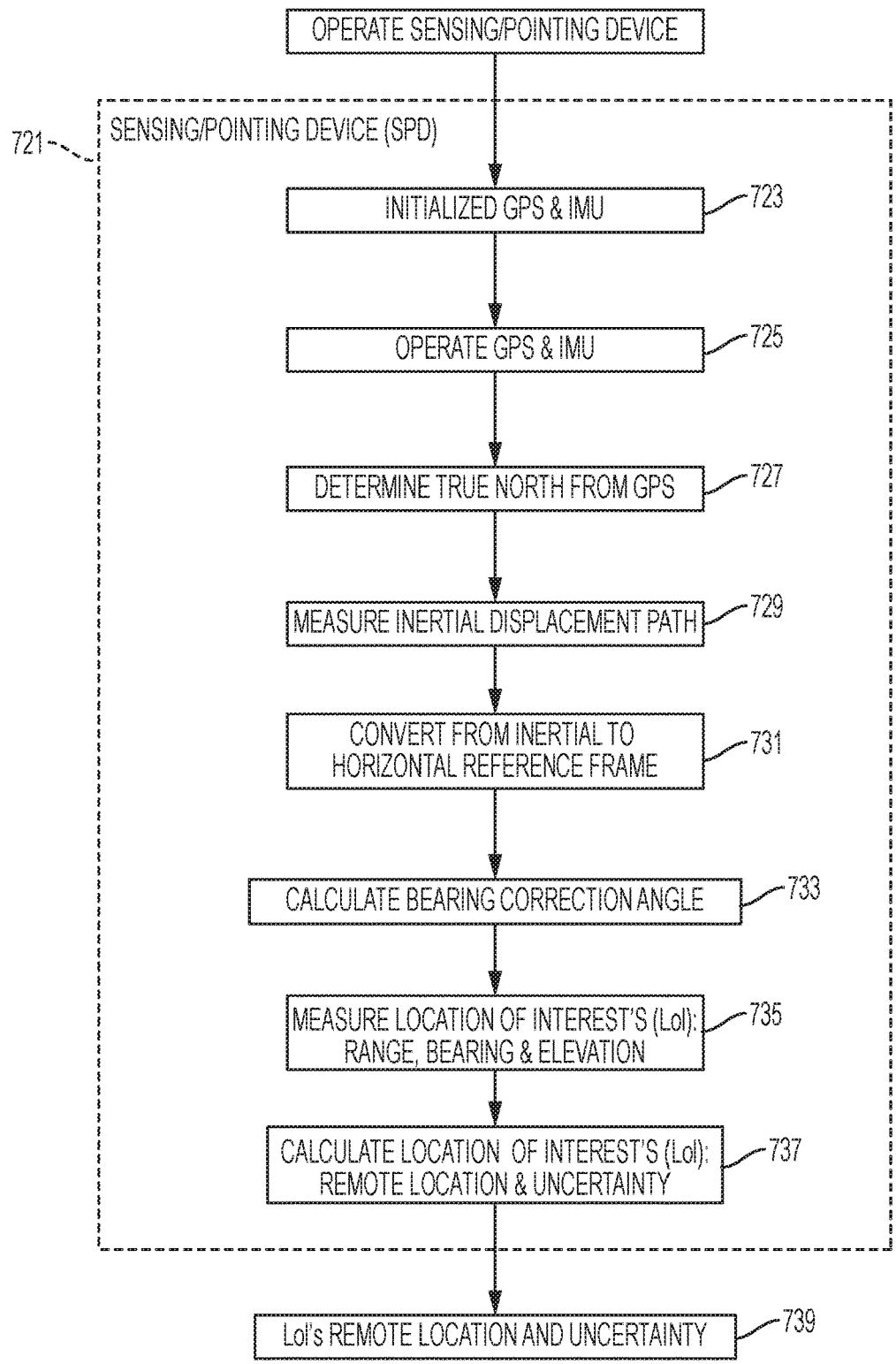
FIG. 14 is an exemplary high level flow diagram of a navigational and location determination system process to determine true north from GPS and to determine location of a remote location of interest.

Exemplary routine 703 Operate_SPD, FIG. 14 step 725, operates SPD 421 GPS 405 and IMU 423 to measure GPS location 409, 415 and IMU acceleration 601, 603, 605 and orientation 607, 609, 611, 617.

Exemplary routine 705 True_North, FIG. 14 step 727, determines true north 447 from GPS geocentric reference frame 441.

Exemplary routine 707 Displacement, FIG. 14 step 729, measures inertial displacement path 431 in inertial reference frame 461.

Exemplary routine 709 Convert_Reference Frame, FIG. 14 step 731, converts from inertial 461 to horizontal reference frame 499.

Exemplary routine 711 Bearing_Angle, FIG. 14 step 733, calculates bearing correction angle (βi) 511 in virtual reference frame 501.

Exemplary routine 713 Laser_Range_Finder, FIG. 14 step 735, operates LRF 425 to measure remote location 439 in virtual reference frame 501.

Exemplary routine 715 Remote_Location, FIG. 14 step 737, calculates remote location 439 in geocentric reference frame 441.

Figure 15:
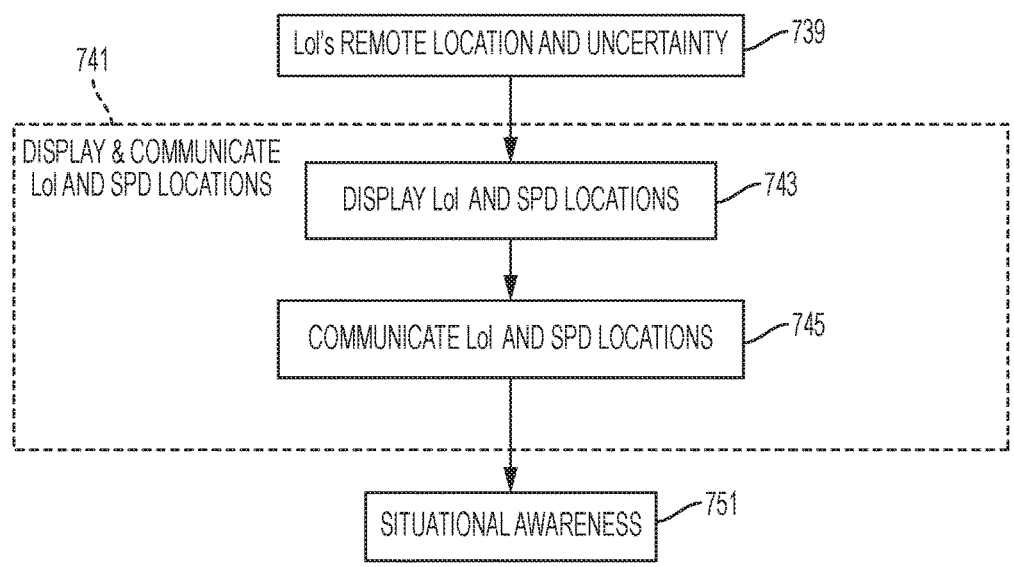
FIG. 15 is an exemplary high level flow diagram to display and communicate sensing/pointing device location and location of interest remote location.
Figure 23:
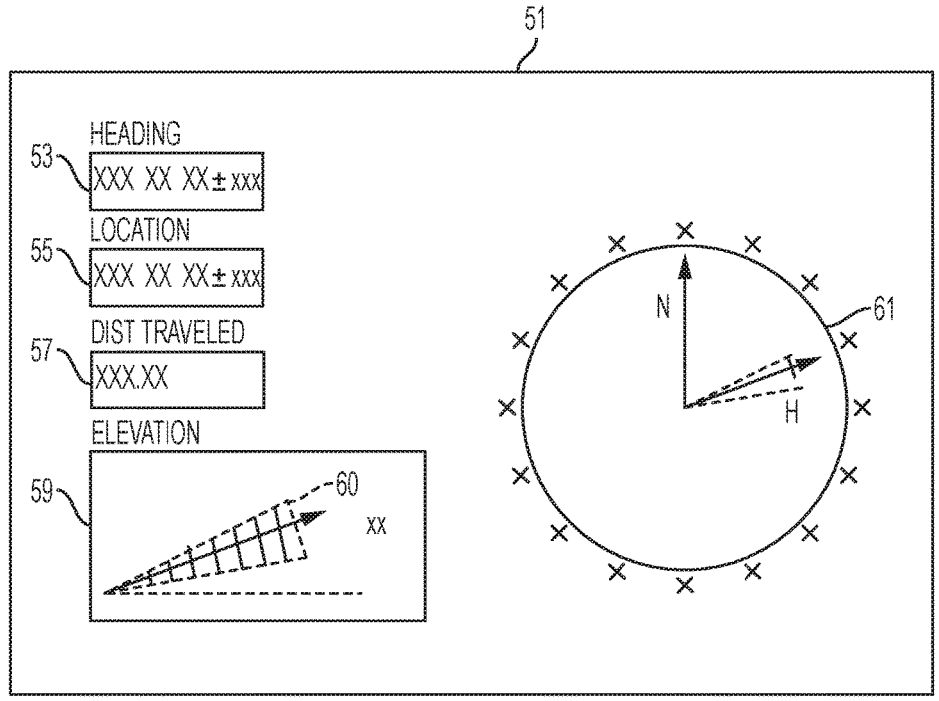
FIG. 23 shows a navigation display.
Figure 24:
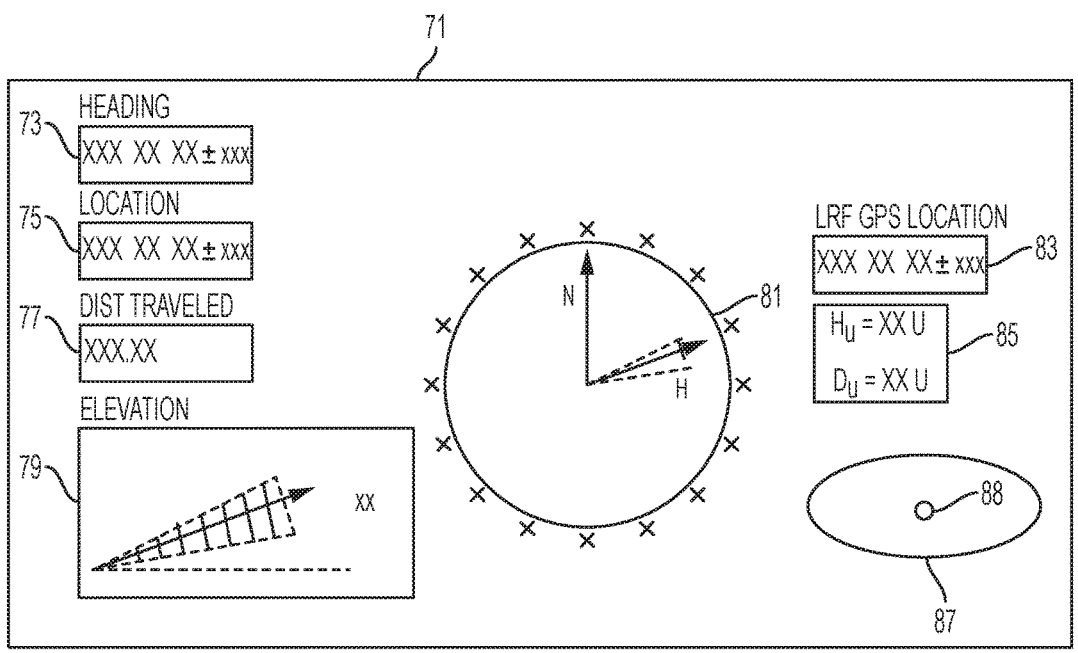
FIG. 24 shows a navigation display device with LRF LoI location coordinates with uncertainty.
Figure 25:
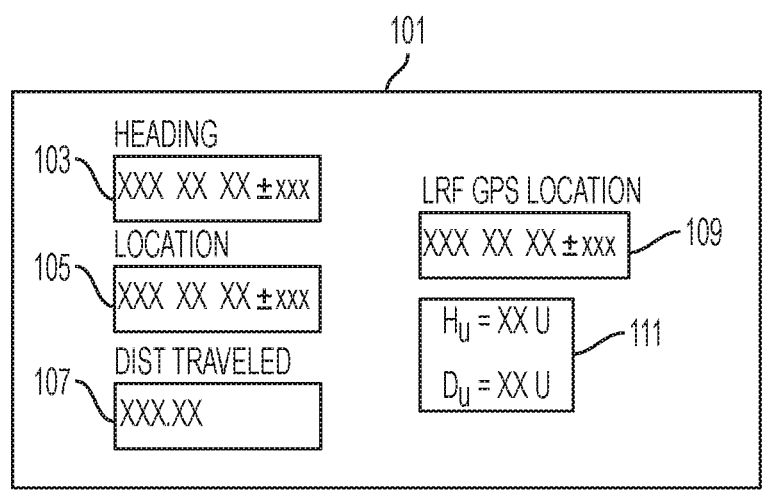
FIG. 25 shows another exemplary embodiment display including a minimal display with a LRF LoI location coordinates with uncertainty.

Exemplary routine 717 Display_Location, FIG. 15 step 743, displays location information (FIG. 23 (55), FIG. 24 (75,83), FIG. 25 (105,109)) in geocentric reference frame 441.

Exemplary routine 719 Communicate_Location, FIG. 15 step 745, communicates location information 411, 439 in geocentric reference frame 441.

Referring to FIG. 14, a high level flow diagram of a SPD 421 is provided. SPD 421 GPS 405 and IMU 423 are initialized 701, 723 by holding the SPD 421 still and level so that GPS 405 can lock onto GPS satellite constellation to determine a location fix, and so that IMU 423 can warm up and stabilize to measure downward gravity vector 481. SDP 421 then operates 703, 725 to periodically measure GPS location 409, 411, and to continuously measure IMU 423 acceleration 601, 603, 605 and orientation 607, 609, 611. The SPD 421 operator can measure GPS waypoint location 411. SPD 423 controller 19 then determines 705, 727 True North 447 from GPS 405 location 409, 411 and carrier phase measurements. IMU 423 continuously measures 707, 729 SPD 421 acceleration 601, 603, 605 and orientation 607, 609, 611, 617 and controller 19 calculates inertial locations 465, 469 and displacement path 463 in inertial reference frame 461. Inertial displacement path 463 is converted 709, 731 from inertial reference frame 461 to horizontal reference frame 499 by using downward gravity vector 481 as a reference. Bearing correction angle (βi) 511 is calculated 711, 733 by comparing geocentric reference frame 441 second displacement path 415 and horizontal reference frame 499 sixth displacement path 497. LoI 437 range 427 from SPD 421 is measured 713, 735 by LRF 421 and bearing 435 and elevation 59, 79 are computed from SPD orientation 517 in virtual reference frame 501. LoI 437 remote location 439 and uncertainty 525 are calculated 715, 737 from GPS final waypoint 411 and LRF 421 range 427 and bearing (ψ) 435. This results in LoI's 439 remote location 439 and uncertainty 525, 739.

Referring to FIG. 15, a high level flow diagram of a SPD 421 display 207 and communication device 205 is provided. SPD 421 display 207 displays 717, 743 SPD 421 and LoI 437 locations 411, 439 and uncertainty 525, 739 to SPD operator. Communication device 205 optionally communicates 719, 745 SPD 421 and LoI 437 locations 411, 439 and uncertainty 525, 739 to remote operator resulting in situational awareness (SA) 751.

Figure 16:
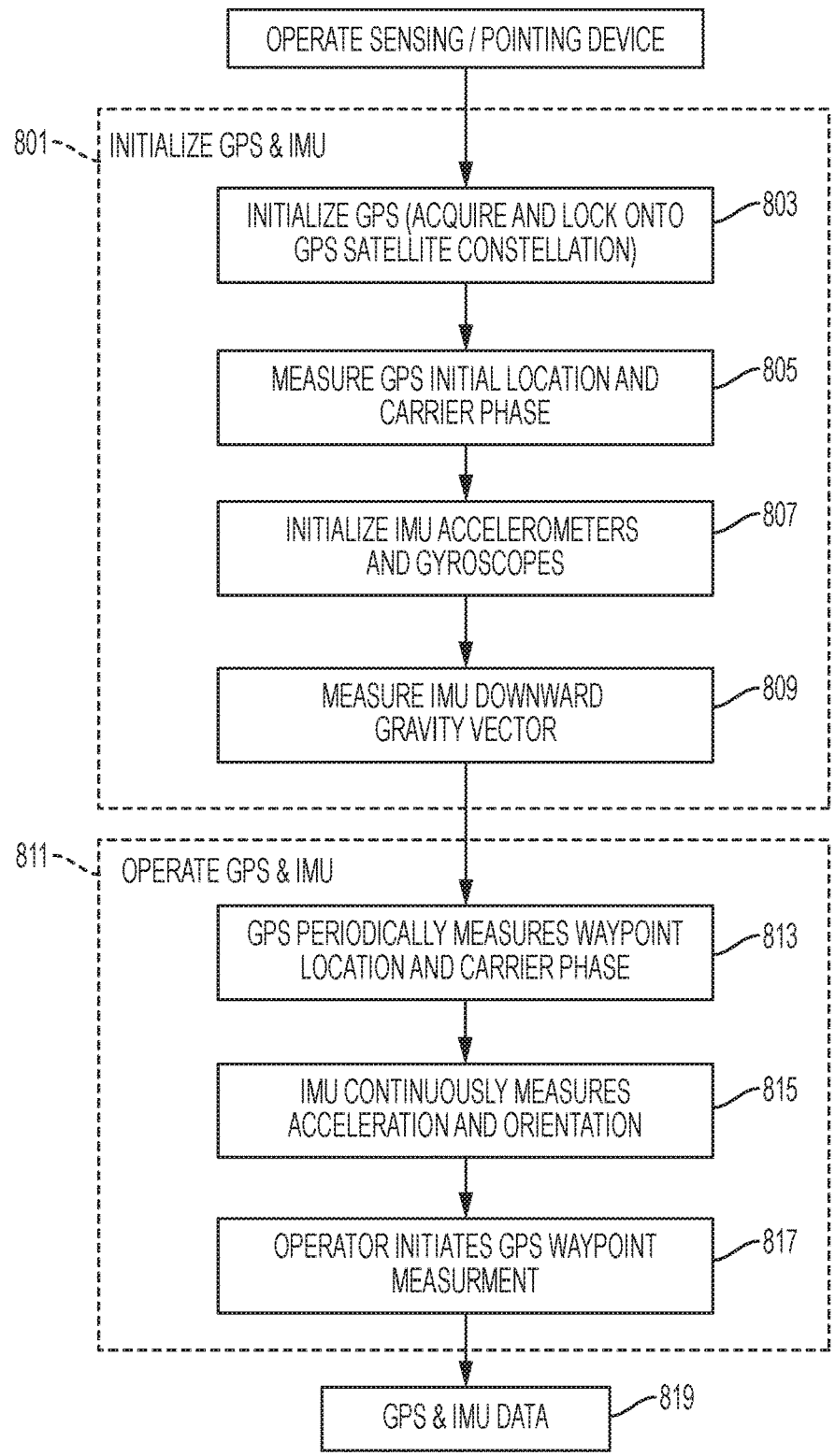
FIG. 16 is an exemplary flow chart initialize and operate sensing/pointing device GPS and Inertial Measurement Unit (IMU)

Referring to FIG. 16, a flowchart to initialize and operate SPD 421 GPS 405 and IMU 423 is provided. Step group 801 initializes sensing/pointing device (SPD) 421 GPS 405 and IMU 423 by holding the SPD 421 still and level. Step 803 initializes GPS 405 to acquire and lock onto GPS satellite constellation to determine a location fix. Step 805 measures GPS initial location 409, and GPS carrier phase for real time kinematic (RTK) or carrier phase tracking GPS for increased accuracy. Step 807 initializes IMU 423 accelerometers 601, 603, 605 and gyroscopes 607, 609, 611 by allowing them to warm up and stabilize before reading acceleration and orientation. Step 807 measures IMU 423 downward gravity vector 481 for reference in converting inertial 461 to horizontal 499 reference frames. Downward gravity vector 481 is subtracted from subsequent IMU 423 accelerometer 601, 603, 605 measurements in step group 811, operate GPS 405 and IMU 423.

Step group 811 operates sensing/pointing device (SPD) 421 GPS 405 and IMU 423 to measure GPS location 409, 415 and IMU acceleration 601, 603, 605 and orientation 607, 609, 611, 617. Step 813 periodically measures SPD 421 waypoint location 409, 411 and carrier phase using GPS 405. Step 815 continuously measures SPD 421 acceleration and orientation using IMU 423 accelerometers 601, 603, 605 and gyroscopes 607, 609, 611. IMU 423 controller 613 computes relative location 615 and orientation 617 in inertial reference frame 461. In step 817, an operator can initiate GPS 405 waypoint measurement 409, 411 to provide final GPS waypoint 411 for LRF 425 range 427 and bearing 435 measurement to LoI 437. These measurements produce GPS 405 and IMU 423 location 409, 411 and orientation 517 data 819.

Figure 17:
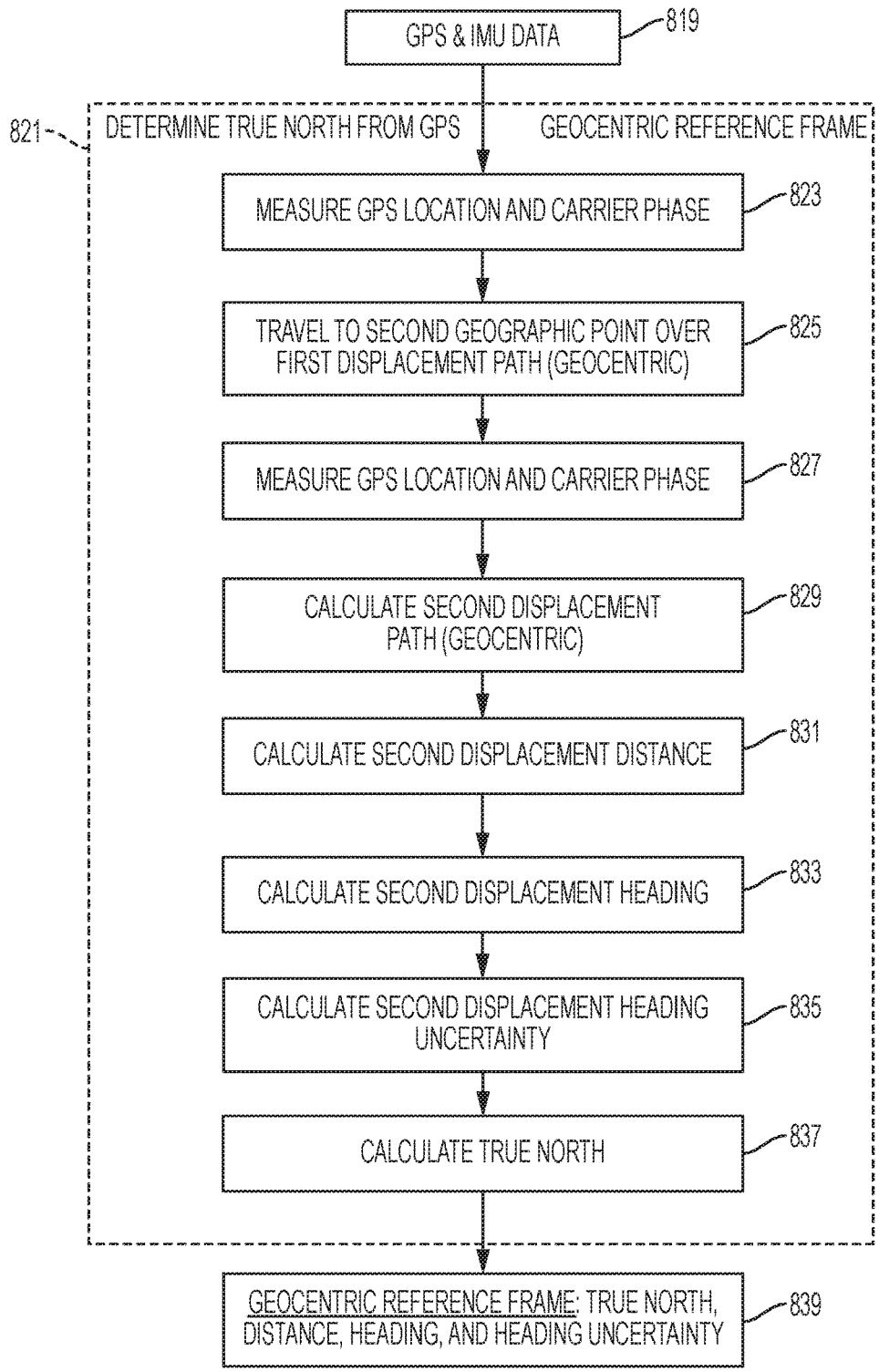
FIG. 17 is an exemplary flow chart to determine true north from GPS in geocentric reference frame.

Referring to FIG. 17, a flowchart to determine True North 447 is provided. Step group 821 determines True North 447 from GPS location measurements 409, 411 in geocentric reference frame 441 from GPS and IMU data 819 received from step group 811. Step 823 measures initial GPS location 409 and carrier phase and parallels step 805 in step group 801. Step 825 causes SPD 421 to travel to second geographic point 411 over first displacement path 413 producing a distance offset for GPS 405 True North 447 measurement. Step 827 measures GPS location and carrier phase at second geographic point 411. Step 829 calculates second displacement path 415 from initial GPS location 409 and second geographic point 411. Step 831 calculates second displacement distance 459. Step 833 calculates second displacement heading 417. Step calculates 835 calculates second displacement heading uncertainty 457. Step 837 calculates True North 447 from second displacement heading 417. These measurements produce True North 447, distance 459, heading 417, and heading uncertainty 457 data 819.

Figure 18:
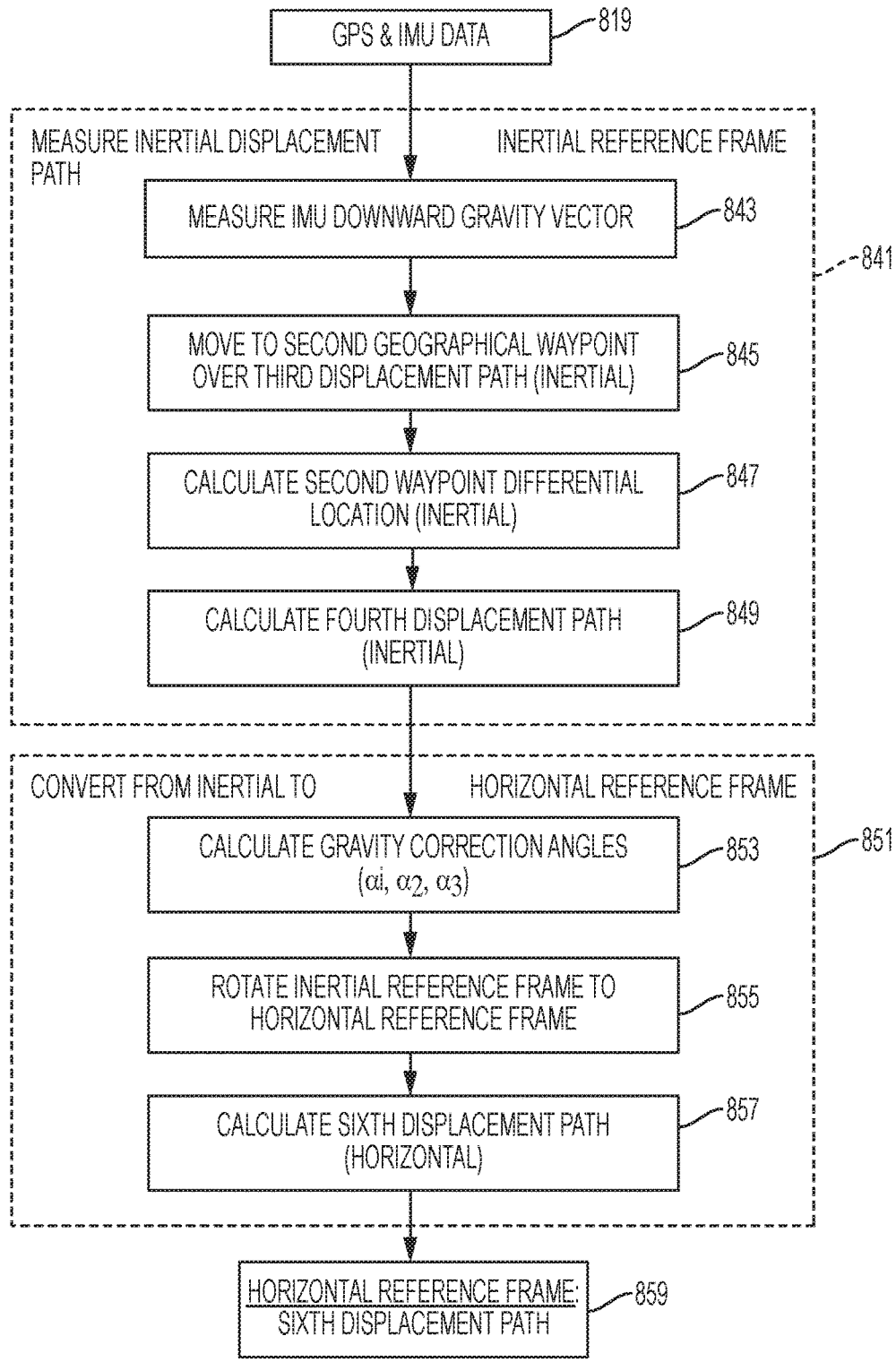
FIG. 18 is an exemplary flow chart to measure inertial measurement path in inertial reference frame and to convert from inertial to horizontal reference frame.

Referring to FIG. 18, a flowchart to measure inertial displacement path 431 and convert from inertial 461 to horizontal 499 reference frame is provided. Step group 841 measures inertial displacement path 431 in inertial reference frame 461. Step 843 measures downward gravity vector 481 for reference in converting inertial 461 to horizontal 499 reference frames and parallels step 809 in step group 801. Step 845 causes SPD 421 to travel from first geographical waypoint 409 to second geographic waypoint 411 over third displacement path 431 producing a distance offset for IMU 423 inertial measurement 469. Step 847 calculates second waypoint differential location 469 at second inertial waypoint 469. Step 849 calculates fourth displacement path 463 from first inertial waypoint 465 to second inertial waypoint 469.

Step group 851 converts from inertial 461 to horizontal reference frame 499. Step 853 calculates gravity correction angles ($\alpha_i$, $\alpha_2$, $\alpha_3$) 483, 487, 489 from downward gravity vector 481 initial measurement in steps 809, 843 in inertial reference frame 461. Step 855 rotates inertial reference frame 461 to horizontal reference frame 499 by applying gravity correction angles ($\alpha_i$, $\alpha_2$, $\alpha_3$) 483, 487, 489 to inertial axis (X, Y, Z) 475, 477, 479 aligning inertial Z axis 479 with downward gravity vector 481. Resulting horizontal reference frame 499 Z' axis 485 becomes aligned with downward gravity vector 481 eliminating one variable. Horizontal reference frame 499 X' 491 and Y' axis 449 fall in the horizontal reference frame 499 allowing them to be compared with 2-dimensional geocentric reference frame 441. Step 857 calculates sixth displacement path 497 from first horizontal waypoint (x4,y4) 505 to second horizontal waypoint (x5,y5) 507. These measurements produce sixth displacement path 497, 859 in horizontal reference frame 499.

Figure 19:
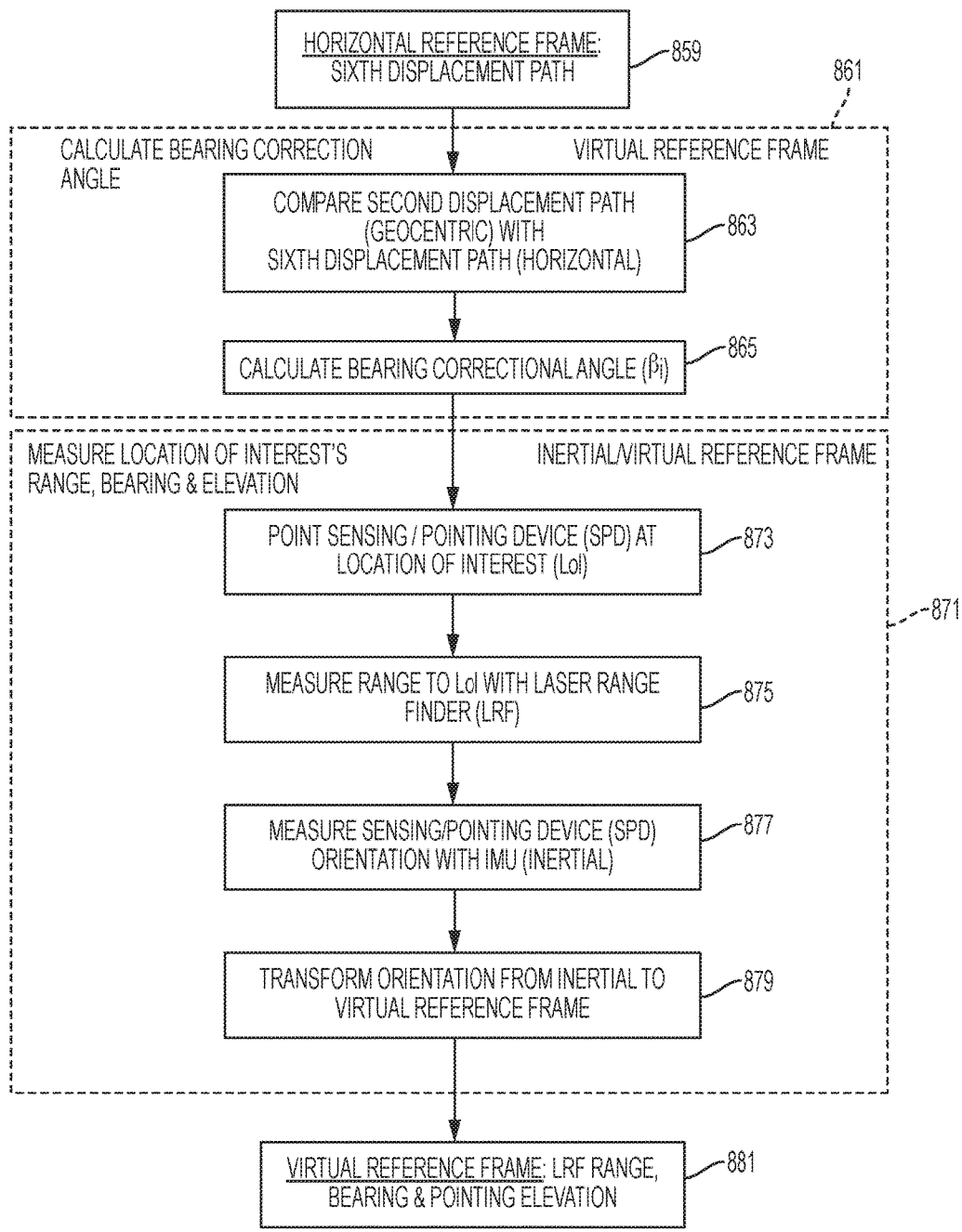
FIG. 19 is an exemplary flow chart to calculate bearing correction angle from horizontal to virtual reference frame, and to measure LoI's range, bearing and elevation in inertial and virtual reference frames.

Referring to FIG. 19, a flowchart to calculate bearing correction angle 511 and measure LoI's 437 range 427, bearing 435 and elevation 59, 79 is provided. Step group 861 calculates bearing angle ($\beta i$) 511 from virtual 461 to horizontal 499 reference frame. Step 863 compares second displacement path 415 (geocentric) with sixth displacement path 497 (horizontal). Step 865 calculates bearing correction angle ($\beta i$) between second displacement path 415 and sixth displacement path 497.

Step group 871 measures LoI's 437 range 427, bearing 435 and elevation 59, 79 in inertial 461 and horizontal 499 reference frames. In step 873, the operator points SPD 421 at LoI. Step 875 measures range 427 to LOI 437 with LRF 425. Step 877 measures SPD 421 orientation with IMU 423. Step 879 transforms SPD 421 orientation 517 from inertial 461 to virtual reference frame 501. These measurements produce LRF 425 range 427, bearing ($\psi$) 435 and pointing elevation 59, 79, 881 in virtual reference frame 501.

Figure 20:
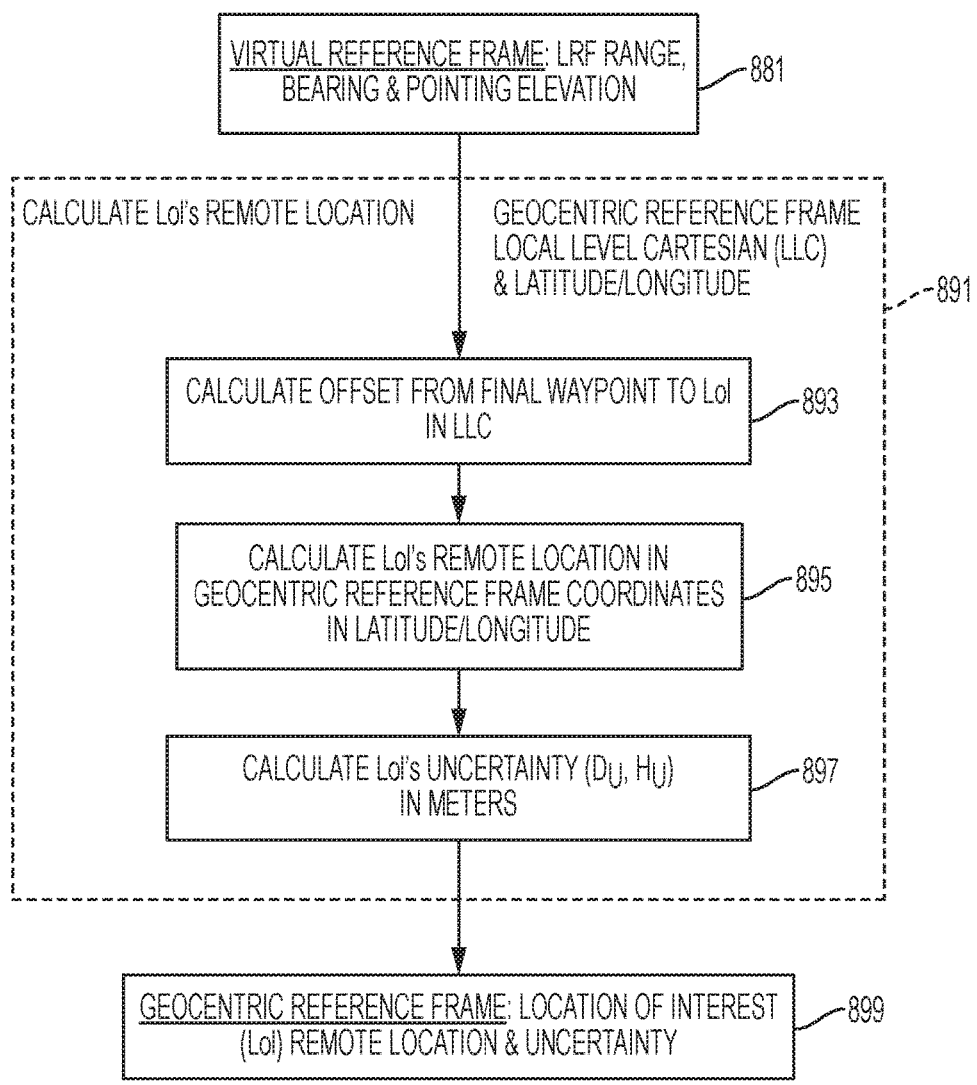
FIG. 20 is an exemplary flow chart to calculate LoI's remote location in geocentric reference frame.

Referring to FIG. 20, a flowchart to calculate LoI's 437 remote location from LRF 425 range 427, bearing ($\psi$) 435 and pointing elevation 59, 79, 881. Step group 891 calculates LoI's 437 remote location 439 in local level Cartesian (LLC) and latitude/longitude coordinates. Step 893 calculates coordinate offset from final waypoint 411 to LoI 437 in in local level Cartesian (LLC) coordinates. Step 895 calculates LoI's 437 remote location 439 in geocentric reference 441 frame in latitude/longitude coordinates. Step 897 calculates LoI's 437 uncertainty ($D_U$, $H_U$) 525 in meters. These measurements produce LoI 437 remote location 439 and uncertainty 525, 899 in geocentric reference frame 441.

Figure 21:
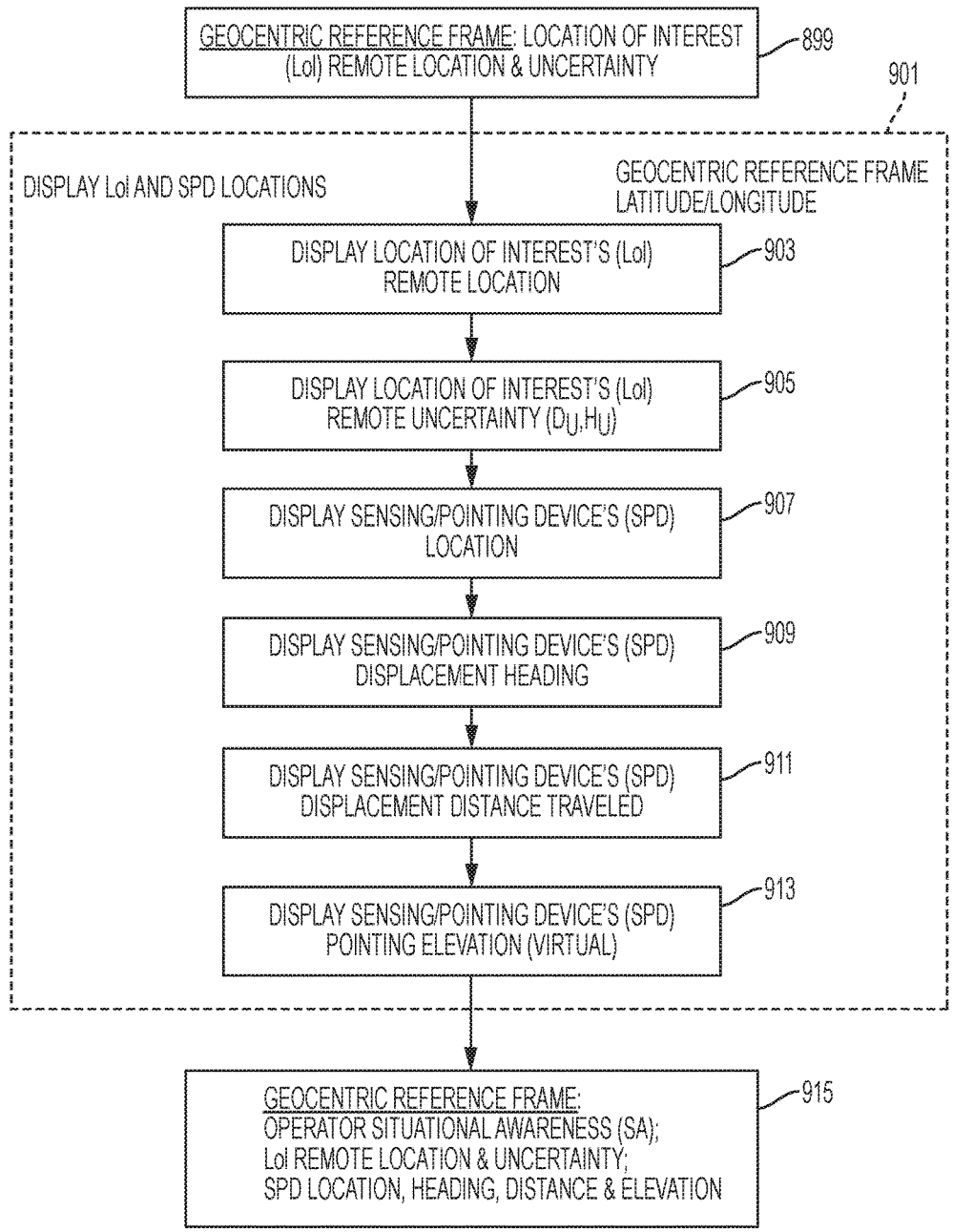
FIG. 21 is an exemplary flow chart to display location of interest and sensing/pointing device locations in geocentric reference frame for situational awareness.

Referring to FIG. 21, a flowchart to display LoI 437 and SPD 412 locations from LoI 437 remote location 439 and uncertainty 525, 899. Step group 901 displays LoI 437 and SPD 412 locations from LoI 437 remote location 439 and uncertainty 525, 899 in geocentric reference frame 441. Step 903 displays LoI's 437 remote location 439 in latitude/ longitude 83, 109. Step 905 displays LoI's 437 remote uncertainty ($D_U$, $H_U$) 439 in meters 85, 87. Step 907 displays SPD's 421 location (x1, y1) 411 in latitude/longitude 55, 75, 105. Step 909 displays SPD's 421 displacement heading ($\theta$) 417, 53, 73, 103. Step 911 displays SPD's 421 displacement distance traveled 459, 57, 77, 107. Step 913 displays SPD's 421 pointing elevation 59, 79 in virtual reference frame 501. These displays produce situational awareness (SA) 915 with LoI 437 remote location 439 and uncertainty 525; and SPD 412 location 411, heading 417, displacement distance 459 and elevation 59, 79 in geocentric reference frame 441.

Figure 22:
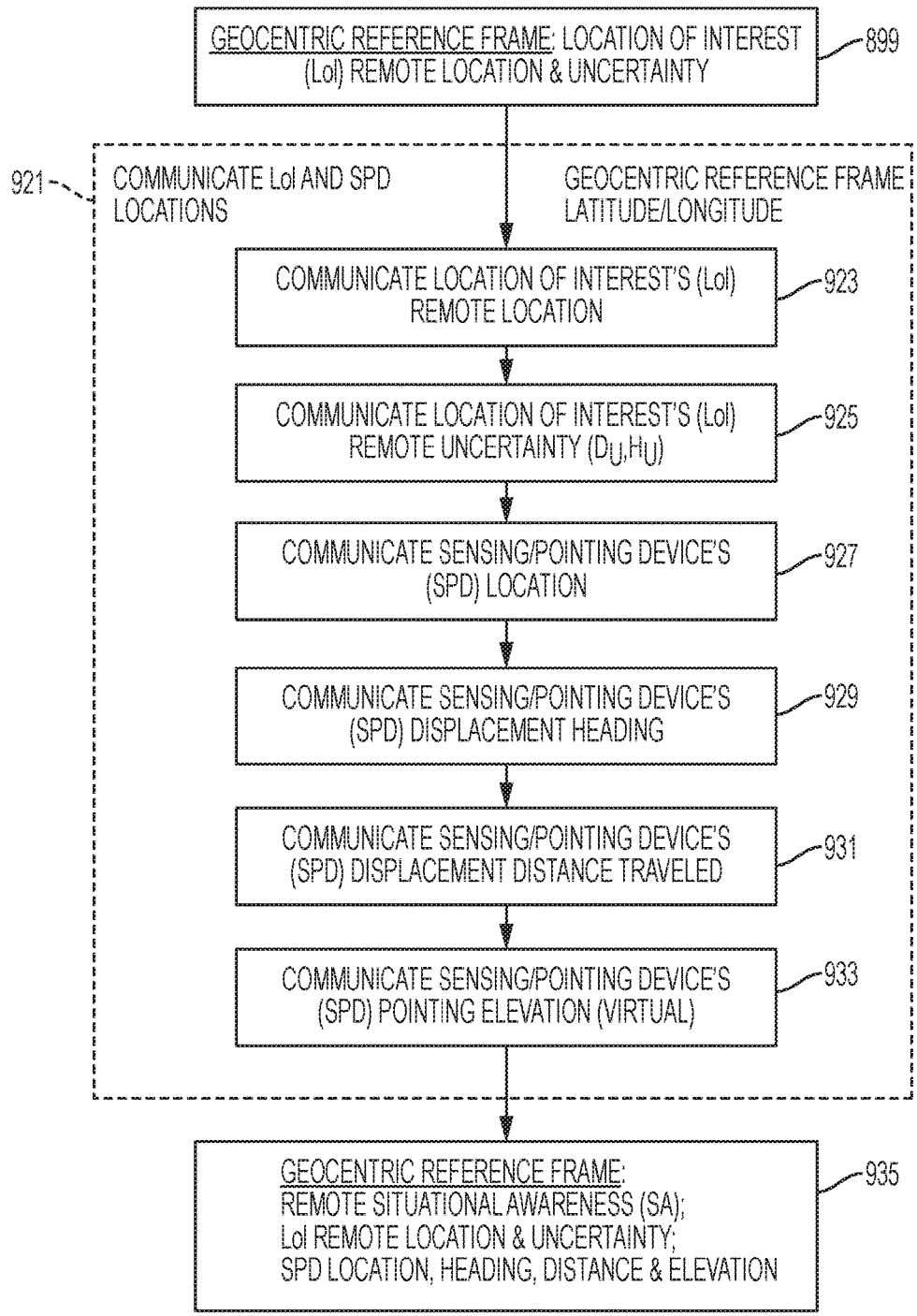
FIG. 22 is an exemplary flow chart to communicate location of interest and sensing/pointing device locations in geocentric reference frame for remote situational awareness.

Referring to FIG. 22, a flowchart to communicate LoI 437 and SPD 412 locations from LoI 437 remote location 439 and uncertainty 525, 899. Step group 921 communicates LoI 437 and SPD 412 locations from location of interest (LoI)

437 remote location 439 and uncertainty 525, 899 in geocentric reference frame 441. Step 923 communicates LoI's 437 remote location ( ) 439 in latitude/longitude. Step 925 communicates LoI's 437 remote uncertainty ($D_U$, $H_U$) 439 in meters. Step 927 communicates SPD's 421 location (x1, y1) 411 in latitude/longitude. Step 929 communicates SPD's 421 displacement heading (θ) 417. Step 931 communicates SPD's 421 displacement distance traveled 459. Step 933 communicates SPD's 421 pointing elevation 59, 79 in virtual reference frame 501. These communications produce remote situational awareness (SA) 935 with LoI 437 remote location 439 and uncertainty 525; and SPD 412 location 411, heading 417, displacement distance 459 and elevation 59, 79 in geocentric reference frame 441.

FIG. 23 shows a navigation display 51. An exemplary display 51 includes a Digital Display of Heading of Device 53 Orientation in Degrees, Minutes, Seconds, or Degrees Decimal±Current uncertainty in heading/orientation. The exemplary display also Current GPS location in In Degrees, Minutes, Seconds, or Degrees Decimal±Current uncertainty in location 55. Distance traveled+units is also shown 57. An exemplary display also includes a symbol representing the elevation orientation with respect to local gravity field or the down direction 59. Shading represents uncertainty in elevation. XX=Digital display of elevation 0°=Flat, 90°=straight up, and −90°=straight down. Compass style representation 61 of Heading/Orientation as well as N=True North, H=Heading/Orientation, Little 'x'=Degrees on the compass, and Shaded triangle=Uncertainty in heading 61.

FIG. 24 shows a navigation display device with laser range finder in accordance with another embodiment of the invention 71. An exemplary embodiment includes Digital Display of Heading of Device Orientation In Degrees, Minutes, Seconds, or Degrees Decimal±Current uncertainty in heading/orientation 73. The exemplary embodiment display also includes Current GPS location in In Degrees, Minutes, Seconds, or Degrees Decimal±Current uncertainty in location 75. Distance traveled+units is also shown 77. An exemplary embodiment also includes symbol which can represent elevation orientation with respect to local gravity field or the down direction 79. Shading represents uncertainty in elevation. XX=Digital display of elevation 0°=Flat, 90°=straight up, and −90°=straight down. An exemplary display also can include a compass style representation of Heading/Orientation, N=True North, H=Heading/Orientation, Little 'x'=Degrees on the compass, and Shaded triangle=Uncertainty in heading 79. An exemplary display also includes LRF=Laser Ranger Finder and LRF GPS Location refers to the GPS coordinates of a target that LRF is being used on 83. An exemplary embodiment display includes Hu as horizontal uncertainty in the LRF GPS, Location with 'U' being the units that 'XX' is being measured in, and Du is the down range uncertainty in the LRF GPS Location with 'U' being the units that 'XX' is being measured in 85. An exemplary embodiment can also include Graphical representation of Hu and Du 87. An exemplary embodiment can include a black dot at center equals that the LRF GPS Location 88.

FIG. 25 shows another exemplary embodiment display including a minimal display with a laser range finder 101. An exemplary embodiment can include a Digital Display of Heading of Device Orientation 103, Current GPS location in Degrees, Minutes, Seconds, or Degrees Decimal±Current uncertainty in location 105. Distance traveled+units is also shown 107. A display embodiment can also include LRF=Laser Ranger Finder where LRF GPS Location refers to the GPS coordinates of a target that LRF is being used on 109. An exemplary embodiment can also show Hu as the horizontal uncertainty in the LRF GPS Location with 'U' being the units that 'XX' is being measured in 111. An exemplary embodiment can show Du as a down range uncertainty in the LRF GPS Location with 'U' being the units that 'XX' is being measured in 111.

An exemplary embodiment can include calculations capable of deriving a compass heading via an IMU/GPS integrated unit without magnetic calibration and to do so with sufficient accuracy as to be practical to use as a pedestrian carried device.

In exemplary embodiments, a remote geolocation system comprises a case having a plurality of components disposed within said case. The plurality of components comprises a sensing/pointing device (SPD) comprising an inertial measurement unit (IMU) having orthogonally disposed three axis accelerometers/gyroscopes in a strap down configuration; a global positioning system (GPS) receiver; a laser range finder (LRF) aligned with one IMU axis; a display; a controller/processor configured to execute a plurality of non-transitory machine readable instructions or control logic (NTMRIs)/(CL). Said NTMRIs/CL comprise controller/processor instructions or logic that operate the processor/controller to determine SPD orientation at an activation point (AP), take a sequence of GPS location data and IMU orientation measurements from a starting location to AP, detect gravity vector at least at said AP using said IMU, determine true north data by computing a path line from any one said sequence of GPS location data to the AP and selecting a line of latitude passing through the path line, determine a line of bearing from the SPD along the LRF axis based on the true north data, determining a line of bearing correction angle using rotational transforms, measure the LRF's orientation using the IMU and range from AP to target using the LRF, compute a target geo-location offset and geo-location of the target based on the range from the AP and GPS location data of the GPS receiver at the AP as well error data associated with the geo-location offset and geo-location of the target, and display distance and heading traveled from starting point to AP, AP's location, LRF range, bearing and elevation from AP to target, and target's latitude, longitude, elevation, and location error.

In exemplary embodiments, a remote geolocation system comprises an apparatus comprising a SPD that comprises an inertial navigation unit (INU) comprising an inertial measuring unit (IMU) comprising three axis accelerometers and three axis gyroscopes in a strapped-down configuration in the SPD with one IMU axis aligned with a laser output of the laser range finder and the three IMU axis are disposed orthogonal with each other. The SPD further includes a global positioning system (GPS), a control system, and a machine readable recording medium storing a plurality of non-transitory machine readable instructions adapted to determine an orientation of the IMU at a selected point with respect to the Earth based on position determinations using the GPS and IMU orientation data acquired at each said position determination along a displaced path which are used to determine true north data that is used to align one axis associated with outputs from said IMU, another IMU output axis is aligned with gravity. The plurality of non-transitory machine readable instructions further determine position of the target comprising latitude, longitude, and elevation when the laser range finder is activated. The plurality of machine readable instructions further comprise an error determination module which determines an error value of the position of the target.

In exemplary embodiments, a remote geolocation system comprises a SPD formed with a pointing alignment structure; a laser range finder coupled with the SPD aligned with the pointing alignment structure; a display disposed into the SPD that displays a plurality of graphical user interfaces; a communications device that remotely communicates output to remote operator resulting in situational awareness (SA); an inertial navigation unit (INU) comprising an inertial measurement unit (IMU) placed into a strap down configuration within the SPD comprising three axis accelerometers, three axis gyroscopes, with an x-axis of the accelerometer and gyroscope axis aligned with the alignment structure and the laser range finder's pointing axis, said INU further includes a global positioning system (GPS); a machine readable storage medium that stores a plurality of machine readable instructions; a processor coupled within the SPD in communication with the INU and laser range finder (LRF) which is configured to read the plurality of machine readable instructions and data structures stored in the machine readable recording medium; and a control section including a trigger or control that receives an activation input from a user which activates the LRF to determine distance to a target when the user points the alignment structure at a target. Said plurality of machine readable instructions comprises a plurality of machine readable instructions comprising a first plurality of machine readable instructions that operates the INU, IMU and GPS; a second plurality of machine readable instructions configured to generate a three axis x, y, and z data model; a third plurality of machine readable instructions that creates a three dimensional geo-reference map model comprising latitude and longitude information overlaid over terrain that the SPD is traversed over; a fourth plurality of machine readable instructions that selectively starts recording latitude and longitude data of the SPD at a plurality of stored location points starting at an initial location point selected by the user using the control section or the graphical user interface along a displacement path that the user carrying the SPD passes over ending in a final location point; a fifth plurality of machine readable instructions that receives a remote georeference determination activation from the control section, or graphical user interface or switch which activates the laser rangefinder to obtain a target distance measurement between the SPD and the target at the final location point and determines a path line between the initial location point and the final location point then selects and stores a line of longitude from the map model which passes through the path line as a selected line of longitude data; a sixth plurality of machine readable instructions that rotates rotational matrix so that it rotates axis data to rotate/align the z axis based on inputs from the IMU including z axis IMU sensor output detecting gravity to rotate the x, y, and z to co-align respective z-axis; a seventh plurality of machine readable instructions that rotates or aligns the RFM y axis with the with the selected line of longitude data; a seventh plurality of machine readable instructions that aligns the x axis of the RFM with the laser range finder axis as it points at the target at the final location point; an eighth plurality of machine readable instructions that remotely determines the target's latitude, longitude and elevation based on target distance measurement, the final location point, and the three axis that has been aligned with detected gravity, the selected line of longitude, and the laser range finder's axis that was pointing at the target at the final location point; a ninth plurality of machine readable instructions that determines an error value of the position of the target; a tenth plurality of machine readable instructions that displays: distance and heading traveled from starting point to AP, AP's location, LRF range, bearing and elevation from AP to target, and target's latitude, longitude, elevation, and location error; and an eleventh plurality of machine readable instructions that communicates distance and heading traveled from starting point to AP, AP's location, LRF range, bearing and elevation from AP to target, and target's latitude, longitude, elevation, and location error to remote user for situational awareness (SA).

Although the invention has been described in detail with reference to certain preferred embodiments, variations and modifications exist within the spirit and scope of the invention as described and defined in the following claims.

The invention claimed is:

1. A system, comprising:
a sensing/pointing device (SPD) comprising an inertial measurement unit (IMU) having orthogonally disposed three axis accelerometers/gyroscopes in a strap down configuration;
a global positioning system (GPS) receiver;
a laser range finder (LRF) aligned with one IMU axis;
a display;
a controller/processor configured to execute a plurality of non-transitory machine readable instructions or control logic (NTMRIs)/(CL), wherein said NTMRIs/CL comprise controller/processor instructions or logic that operate the processor/controller to determine SPD orientation at an activation point (AP), take a sequence of GPS location data and IMU orientation measurements from a starting location to AP, detect gravity vector at least at said AP using said IMU, determine true north data by computing a path line from any one said sequence of GPS location data to the AP and selecting a line of latitude passing through the path line, determine a line of bearing from the SPD along the LRF axis based on the true north data, determining a line of bearing correction angle using rotational transforms, measure the LRF's orientation using the IMU and range from AP to target using the LRF, compute a target geo-location offset and geo-location of the target based on the range from the AP and GPS location data of the GPS receiver at the AP as well error data associated with the geo-location offset and geo-location of the target, and display distance and heading traveled from starting point to AP, AP's location, LRF range, bearing and elevation from AP to target, and target's latitude, longitude, elevation, and location error.

2. A system, comprising an apparatus comprising a sensing/pointing device (SPD) that comprises an inertial navigation unit (INU) comprising an inertial measuring unit (IMU) comprising three axis accelerometers and three axis gyroscopes in a strapped-down configuration in the SPD with one IMU axis aligned with a laser output of the laser range finder and the three IMU axis are disposed orthogonal with each other, the SPD further includes a global positioning system (GPS), a control system, and a machine readable recording medium storing a plurality of non-transitory machine readable instructions adapted to determine an orientation of the IMU at a selected point with respect to the Earth based on position determinations using the GPS and IMU orientation data acquired at each said position determination along a displaced path which are used to determine true north data that is used to align one axis associated with outputs from said IMU, another IMU output axis is aligned with gravity, the plurality of non-transitory machine readable instructions further determine position of the target comprising latitude, longitude, and elevation when the laser range finder is activated, the plurality of machine readable instructions further comprise an error determination module which determines an error value of the position of the target.

3. A system as in claim 2, wherein the sequence of measurements can include at least two measurements along a path of travel which is not purely vertical in elevation.

4. A system as in claim 2, wherein distance is lengthened and time decreased between measurements to increase accuracy.

5. A system as in claim 2, wherein the desired orientation is true north and the determined accuracy is improved by employing: Differential Global Positioning System (DGPS), satellite-based Wide Area Augmentation System (WAAS), Real Time Kinematic (RTK), or carrier phase tracking GPS, to less than five angular mil degrees accuracy.

6. A system as in claim 2, wherein the location includes elevation of the apparatus at each point of the sequence of measurements.

7. A system as in claim 2, wherein the selected orientation of the apparatus at a desired point comprises a first point at which a predetermined accurate orientation value is determined.

8. A system as in claim 2, wherein the output is remotely communicated by communications device.

9. A system comprising:
- a sensing/pointing device (SPD) formed with a pointing alignment structure;
- a laser range finder coupled with the SPD aligned with the pointing alignment structure;
- a display disposed into the SPD that displays a plurality of graphical user interfaces;
- a communications device that remotely communicates output to remote operator resulting in situational awareness (SA);
- an inertial navigation unit (INU) comprising an inertial measurement unit (IMU) placed into a strap down configuration within the SPD comprising three axis accelerometers, three axis gyroscopes, with an x-axis of the accelerometer and gyroscope axis aligned with the alignment structure and the laser range finder's pointing axis, said INU further includes a global positioning system (GPS);
- a machine readable storage medium that stores a plurality of machine readable instructions;
- a processor coupled within the SPD in communication with the INU and laser range finder (LRF) which is configured to read the plurality of machine readable instructions and data structures stored in the machine readable recording medium; and
- a control section including a trigger or control that receives an activation input from a user which activates the LRF to determine distance to a target when the user points the alignment structure at a target;
- wherein said plurality of machine readable instructions comprises:
  - a plurality of machine readable instructions comprising a first plurality of machine readable instructions that operates the INU, IMU and GPS;
  - a second plurality of machine readable instructions configured to generate a three axis x, y, and z data model;
  - a third plurality of machine readable instructions that creates a three dimensional georeference map model comprising latitude and longitude information overlaid over terrain that the SPD is traversed over;
  - a fourth plurality of machine readable instructions that selectively starts recording latitude and longitude data of the SPD at a plurality of stored location points starting at an initial location point selected by the user using the control section or the graphical user interface along a displacement path that the user carrying the SPD passes over ending in a final location point;
  - a fifth plurality of machine readable instructions that receives a remote georeference determination activation from the control section, or graphical user interface or switch which activates the laser rangefinder to obtain a target distance measurement between the SPD and the target at the final location point and determines a path line between the initial location point and the final location point then selects and stores a line of longitude from the map model which passes through the path line as a selected line of longitude data;
  - a sixth plurality of machine readable instructions that rotates rotational matrix so that it rotates axis data to rotate/align the z axis based on inputs from the IMU including z axis IMU sensor output detecting gravity to rotate the x, y, and z to co-align respective z-axis;
  - a seventh plurality of machine readable instructions that rotates or aligns the RFM y axis with the with the selected line of longitude data;
  - a seventh plurality of machine readable instructions that aligns the x axis of the RFM with the laser range finder axis as it points at the target at the final location point;
  - an eighth plurality of machine readable instructions that remotely determines the target's latitude, longitude and elevation based on target distance measurement, the final location point, and the three axis that has been aligned with detected gravity, the selected line of longitude, and the laser range finder's axis that was pointing at the target at the final location point; and
  - a ninth plurality of machine readable instructions that determines an error value of the position of the target; and
  - a tenth plurality of machine readable instructions that displays: distance and heading traveled from starting point to AP, AP's location, LRF range, bearing and elevation from AP to target, and target's latitude, longitude, elevation, and location error; and
  - an eleventh plurality of machine readable instructions that communicates distance and heading traveled from starting point to AP, AP's location, LRF range, bearing and elevation from AP to target, and target's latitude, longitude, elevation, and location error to remote user for situational awareness (SA).

* * * * *